(12) United States Patent
Diggdon et al.

(10) Patent No.: US 12,008,521 B1
(45) Date of Patent: *Jun. 11, 2024

(54) FINANCIAL MANAGEMENT SYSTEM AND METHOD WITH CUSTOMIZABLE USER INTERFACE

(71) Applicant: Wells Fargo Bank, NA, San Francisco, CA (US)

(72) Inventors: Andrew J. Diggdon, Oakland, CA (US); John Maher, Fairfax, CA (US); Karen Lynne Moore, Vacaville, CA (US); Yon Wing Lee, San Francisco, CA (US); Brian Paul McMahon, Berkeley, CA (US)

(73) Assignee: Wells Fargo Bank, NA, San Francisco, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/565,388

(22) Filed: Dec. 29, 2021

Related U.S. Application Data

(60) Continuation of application No. 16/663,752, filed on Oct. 25, 2019, now Pat. No. 11,250,390, which is a
(Continued)

(51) Int. Cl.
*G06Q 20/00* (2012.01)
*G06Q 20/08* (2012.01)
(Continued)

(52) U.S. Cl.
CPC .......... *G06Q 20/00* (2013.01); *G06Q 20/227* (2013.01); *G06Q 20/405* (2013.01); *G06Q 40/00* (2013.01);
(Continued)

(58) Field of Classification Search
CPC .... G06Q 20/00; G06Q 20/227; G06Q 20/405; G06Q 40/00; G06Q 20/085; G06Q 20/10;
(Continued)

(56) References Cited

U.S. PATENT DOCUMENTS

| | | | |
|---|---|---|---|
| 4,346,442 | A | 8/1982 | Musmanno |
| 4,376,978 | A | 3/1983 | Musmanno |

(Continued)

FOREIGN PATENT DOCUMENTS

| | | |
|---|---|---|
| CA | 2648583 | 4/2007 |
| EP | 1 081 664 | 3/2001 |

(Continued)

OTHER PUBLICATIONS

McChesney, M.C., Banking in cyberspace: an investment in itself, Feb. 1, 1997, IEEE Spectrum vol. 34, Issue: 2, pp. 54-59 describes banking on the internet/world wide web including viewing balances on a user's computer display (Year: 1997).*

(Continued)

*Primary Examiner* — Bennett M Sigmond
*Assistant Examiner* — Bolko M Hamerski
(74) *Attorney, Agent, or Firm* — Foley & Lardner LLP

(57) ABSTRACT

A computer-implemented data processing system includes a data storage device and a processor and program logic stored in memory and executable by the processor. The program logic may include account management logic coupled to the data storage device and configured to manage accounts respectively associated with a plurality of users, the account management logic including account processing logic configured to process transactions for the accounts and store account data related to the accounts in the data storage device. The program logic may further include interface logic coupled to the account management logic and the data storage device, the interface logic configured to connect the (Continued)

data processing system to computing systems associated with the plurality of users by way of the Internet, the interface logic providing the plurality of users with web access to an on-line banking area of a website of a financial institution.

20 Claims, 18 Drawing Sheets

Related U.S. Application Data continuation of application No. 13/612,673, filed on Sep. 12, 2012, now Pat. No. 10,460,379, which is a division of application No. 12/871,768, filed on Aug. 30, 2010, now abandoned.

(60) Provisional application No. 61/238,567, filed on Aug. 31, 2009.

(51) Int. Cl.
  *G06Q 20/10* (2012.01)
  *G06Q 20/14* (2012.01)
  *G06Q 20/22* (2012.01)
  *G06Q 20/40* (2012.01)
  *G06Q 40/00* (2023.01)
  *G06Q 40/02* (2023.01)
  *G06Q 40/03* (2023.01)

(52) U.S. Cl.
  CPC ........... *G06Q 20/085* (2013.01); *G06Q 20/10* (2013.01); *G06Q 20/102* (2013.01); *G06Q 20/14* (2013.01); *G06Q 40/02* (2013.01); *G06Q 40/03* (2023.01)

(58) Field of Classification Search
  CPC ...... G06Q 20/102; G06Q 20/14; G06Q 40/02; G06Q 40/03
  See application file for complete search history.

(56) References Cited

U.S. PATENT DOCUMENTS

| | | | |
|---|---|---|---|
| 4,597,046 A | 6/1986 | Musmanno et al. | |
| 4,774,662 A | 9/1988 | Ito et al. | |
| 4,774,663 A | 9/1988 | Musmanno et al. | |
| 5,193,055 A | 3/1993 | Brown et al. | |
| 5,547,226 A | 8/1996 | Wentworth | |
| 5,710,889 A | 1/1998 | Clark et al. | |
| 5,826,243 A | 10/1998 | Musmanno et al. | |
| 5,890,140 A | 3/1999 | Clark et al. | |
| 5,918,217 A | 6/1999 | Maggioncalda et al. | |
| 5,933,816 A * | 8/1999 | Zeanah | G06Q 40/00 |
| | | | 705/35 |
| 5,940,809 A | 8/1999 | Musmanno et al. | |
| 6,012,043 A | 1/2000 | Albright et al. | |
| 6,058,378 A | 5/2000 | Clark et al. | |
| 6,064,986 A | 5/2000 | Edelman | |
| 6,073,119 A | 6/2000 | Bornemisza-Wahr et al. | |
| 6,173,270 B1 | 1/2001 | Cristofich et al. | |
| 6,324,523 B1 | 11/2001 | Killeen et al. | |
| 6,332,126 B1 | 12/2001 | Peirce et al. | |
| 6,341,353 B1 | 1/2002 | Herman et al. | |
| 6,349,290 B1 | 2/2002 | Horowitz et al. | |
| 6,385,652 B1 | 5/2002 | Brown et al. | |
| 6,430,542 B1 | 8/2002 | Moran | |
| 6,431,439 B1 * | 8/2002 | Suer | G06Q 20/389 |
| | | | 235/382 |
| 6,697,824 B1 | 2/2004 | Bowman-Amuah | |
| 7,050,997 B1 | 5/2006 | Wood, Jr. | |
| 7,231,608 B1 | 6/2007 | Fano et al. | |
| 7,240,028 B1 * | 7/2007 | Rugge | G06Q 40/12 |
| | | | 705/30 |
| 7,451,134 B2 | 11/2008 | Krakowiecki et al. | |
| 7,571,125 B2 | 8/2009 | Coyle | |
| 7,584,107 B2 | 9/2009 | Leisure et al. | |
| 7,599,865 B2 | 10/2009 | Hahn et al. | |
| 7,752,102 B2 | 7/2010 | Thomas | |
| 7,788,146 B2 | 8/2010 | McCarthy, Jr. | |
| 7,818,233 B1 * | 10/2010 | Sloan | G06Q 20/10 |
| | | | 705/37 |
| 7,831,511 B1 | 11/2010 | Akin et al. | |
| 7,865,837 B1 * | 1/2011 | Huff | G06Q 10/109 |
| | | | 715/811 |
| 7,895,102 B1 | 2/2011 | Wilks et al. | |
| 7,962,394 B2 | 6/2011 | Wagner | |
| 8,036,984 B2 | 10/2011 | Elterich | |
| 8,117,553 B2 | 2/2012 | Danninger et al. | |
| 8,121,943 B2 | 2/2012 | Elterich | |
| 8,170,932 B1 | 5/2012 | Krakowiecki et al. | |
| 8,239,298 B1 | 8/2012 | Wilson et al. | |
| 8,266,034 B1 | 9/2012 | Butcher, III | |
| 8,332,297 B1 | 12/2012 | Claus et al. | |
| 8,380,623 B1 | 2/2013 | Ley et al. | |
| 8,473,858 B2 * | 6/2013 | Buchanan | G06F 3/04847 |
| | | | 715/784 |
| 8,719,132 B1 * | 5/2014 | Diggdon | G06Q 20/00 |
| | | | 705/38 |
| 2001/0011242 A1 | 8/2001 | Allex et al. | |
| 2002/0069170 A1 | 6/2002 | Rizzo et al. | |
| 2002/0091635 A1 | 7/2002 | Dilip et al. | |
| 2002/0095363 A1 | 7/2002 | Sloan et al. | |
| 2002/0095651 A1 | 7/2002 | Kumar et al. | |
| 2002/0123949 A1 | 9/2002 | Vanleeuwen | |
| 2002/0174006 A1 | 11/2002 | Rugge et al. | |
| 2002/0188536 A1 | 12/2002 | Milosavljevic et al. | |
| 2002/0198806 A1 | 12/2002 | Blagg et al. | |
| 2003/0004751 A1 | 1/2003 | Ng et al. | |
| 2003/0009402 A1 * | 1/2003 | Mullen | G06Q 40/00 |
| | | | 705/35 |
| 2003/0018550 A1 | 1/2003 | Rotman et al. | |
| 2003/0018557 A1 | 1/2003 | Gilbert et al. | |
| 2003/0033211 A1 | 2/2003 | Haines et al. | |
| 2003/0046195 A1 | 3/2003 | Mao | |
| 2003/0061132 A1 | 3/2003 | Yu et al. | |
| 2003/0097331 A1 | 5/2003 | Cohen | |
| 2003/0101131 A1 | 5/2003 | Warren et al. | |
| 2004/0039701 A1 | 2/2004 | Nakamura et al. | |
| 2004/0068468 A1 | 4/2004 | North | |
| 2004/0111370 A1 | 6/2004 | Saylors et al. | |
| 2004/0153335 A1 | 8/2004 | O'Keeffe | |
| 2004/0236678 A1 | 11/2004 | Johns et al. | |
| 2004/0243508 A1 | 12/2004 | Samson et al. | |
| 2005/0027633 A1 | 2/2005 | Fortuna et al. | |
| 2005/0060252 A1 * | 3/2005 | Doddington | G06Q 10/10 |
| | | | 705/35 |
| 2005/0097033 A1 | 5/2005 | Pretell et al. | |
| 2005/0137953 A1 | 6/2005 | McDonough et al. | |
| 2005/0240526 A1 | 10/2005 | Hill | |
| 2005/0283418 A1 | 12/2005 | Thornborough et al. | |
| 2006/0074788 A1 * | 4/2006 | Grizack | G06Q 40/02 |
| | | | 705/35 |
| 2006/0178958 A1 | 8/2006 | Abdelfattah et al. | |
| 2006/0247987 A1 | 11/2006 | Busch et al. | |
| 2006/0249568 A1 | 11/2006 | Scanlon | |
| 2006/0253329 A1 | 11/2006 | Haines et al. | |
| 2007/0156552 A1 | 7/2007 | Manganiello | |
| 2007/0156554 A1 | 7/2007 | Nikoley et al. | |
| 2007/0226074 A1 | 9/2007 | Haines et al. | |
| 2007/0239572 A1 | 10/2007 | Harris et al. | |
| 2007/0250427 A1 | 10/2007 | Robinson | |
| 2007/0260532 A1 | 11/2007 | Blake, III | |
| 2008/0027775 A1 | 1/2008 | Ellis et al. | |
| 2008/0033876 A1 | 2/2008 | Goldman et al. | |
| 2008/0041942 A1 | 2/2008 | Aissa | |
| 2008/0114703 A1 | 5/2008 | Dahlberg et al. | |
| 2008/0140586 A1 | 6/2008 | Mercier et al. | |
| 2008/0245854 A1 | 10/2008 | Monden | |

(56) References Cited

U.S. PATENT DOCUMENTS

| | | | |
|---|---|---|---|
| 2009/0019357 A1* | 1/2009 | Cudich | G06F 3/0486 |
| | | | 715/234 |
| 2009/0030819 A1 | 1/2009 | Vanleeuwen | |
| 2009/0094156 A1 | 4/2009 | Wright et al. | |
| 2009/0094170 A1 | 4/2009 | Mohn | |
| 2009/0271287 A1 | 10/2009 | Halpern | |
| 2010/0004957 A1 | 1/2010 | Ball | |
| 2010/0094740 A1 | 4/2010 | Richter | |
| 2010/0100469 A1 | 4/2010 | Buchanan et al. | |
| 2010/0250338 A1 | 9/2010 | Banerjee et al. | |
| 2010/0268629 A1* | 10/2010 | Ross | G06Q 10/10 |
| | | | 705/35 |
| 2010/0274830 A1 | 10/2010 | Stever | |
| 2011/0004514 A1 | 1/2011 | Thomas | |
| 2011/0004546 A1 | 1/2011 | Thomas | |
| 2011/0087985 A1 | 4/2011 | Buchanan et al. | |
| 2011/0106691 A1 | 5/2011 | Clark et al. | |
| 2011/0107265 A1* | 5/2011 | Buchanan | G06Q 30/02 |
| | | | 715/835 |
| 2011/0320294 A1 | 12/2011 | Votaw et al. | |
| 2013/0055097 A1* | 2/2013 | Soroca | G06Q 30/0246 |
| | | | 715/738 |

FOREIGN PATENT DOCUMENTS

| | | |
|---|---|---|
| EP | 1 107 149 | 6/2001 |
| EP | 1 143 362 | 10/2001 |
| WO | WO-89/11130 A1 | 11/1989 |
| WO | WO-02/099576 | 12/2002 |

OTHER PUBLICATIONS

Business Wire; "Yahoo! Offers Personalized Financial Management Solution: Yahoo! Finance Money Manager Automatically Tracks, Analyzes and Manages Consumers' Personal Finances for Free" Dec. 6, 2001; 3 pages.

Define: "link" as "A segment of text or a graphical item that serves as a cross-reference between parts of a webpage or other hypertext documents or between webpages or other hypertext documents." See The American Heritage Science Dictionary (2002), 3 pages.

Gaizauskas, et al. Coupling Information Retrieval and Information Extraction: A New Text Technology for Gathering Information from the Web. 1997. Proceedings of RIAO 97: computer-Assisted Information Searching on the Internet. Montreal, Canada, 15 pages.

http:///web.intuit.com/support/quicken/2000/mac/2226.html. Reconciling Online Bank Accounts, last modified Jul. 25, 2003, 2 pages.

http://www.fremontbank.com/personal_banking/pam/pam.htm. Personal Account Manager, filed in U.S. Appl. No. 12/324,637 on Mar. 16, 2009, 2 pages.

http://www.wellsfargo.com Account Management, filed in U.S. Appl. No. 12/324,637 on Mar. 16, 2009, 2 pages.

Mcchesney, M.C., Banking in cyberspace: an investment in itself, Feb. 1, 1997, IEEE Spectrum vol. 34, Issue: 2, pp. 54-59 (Year: 1997).

Microsoft Press Computer Dictionary 2nd Edition; 1995; 3 page.

PR Newswire; "Credit Counseling Reduces Financial Stress"; Thursday, Apr. 18, 2002; pp. 1-2.

Romney, Marshall and Callister, Richard; "Easy Money: QuickBooks Pro 4.0 & Quicken Financial Suite for Windows"; New Accountant, v. 11, n7; Apr. 1996; pp. 1-5.

* cited by examiner

| ACCOUNTS | BILL PAY | TRANSFERS | BROKERAGE | ACCOUNT SERVICES | FINANCE MANAGER | MESSAGES & ALERTS | |
|---|---|---|---|---|---|---|---|

SIGN OFF   HOME   LOCATIONS   CONTACT US   ⊟ONLINE SECURITY GUARANTEE   PRODUCT SEARCH [      ]

| VIEW MESSAGES & ALERTS | SETUP MODIFY ALERTS | PRODUCTS & OFFERS |
|---|---|---|

— 650

SET UP/MODIFY ALERTS
⊙ YOU HAVE SUCCESSFULLY UPDATED BUDGET ALERTS. —652

SECURITY AND GENERAL ALERTS           ? HELP

| DESCRIPTION | ALERTS VIEW SAMPLE | ACTIONS |
|---|---|---|
| ALERTS FOR USERNAME CHANGES, PASSWORD CHANGES, AND SUSPENDED ACCESS. | USERNAME CHANGE PASSWORD CHANGE ACCESS SUSPENDED | MODIFY |
| TAX AND IRA CONTRIBUTION REMINDERS. | NONE SELECTED | SET UP |
| UNUSUAL ATM CHECK/CARD ACTIVITY. | NONE SELECTED | SET UP |

PERSONAL CHECKING —654

| ACCOUNT | ALERTS VIEW SAMPLE | ACTIONS |
|---|---|---|
| 123-4567XXX | OVERDRAFT PROTECTION ADVANCE —664 | MODIFY —666 |

PERSONAL SAVINGS —656

| ACCOUNT | ALERTS VIEW SAMPLE | ACTIONS |
|---|---|---|
| 987-6543XXX | OVERDRAFT PROTECTION ADVANCE | MODIFY |

MORTGAGE —658

| ACCOUNT | ALERTS VIEW SAMPLE | ACTIONS |
|---|---|---|
| XXXXX1234 | NONE SELECTED | SET UP |

BUDGET ALERTS —660

| DESCRIPTION | ALERTS VIEW SAMPLE | ACTIONS |
|---|---|---|
| ALERTS TO TRACK YOUR BUDGET | BUDGET ALERTS | MODIFY |

CANCEL ALERTS —662

CANCEL ALERTS FOR  [SELECT ONE ▽]  [SAVE] —668

YOU CANNOT CANCEL THE SECURITY ALERTS WE SEND FOR USERNAME CHANGES, PASSWORD CHANGES, AND SUSPENDED ACCESS.

FIG. 12

FINANCIAL MANAGEMENT SYSTEM AND METHOD WITH CUSTOMIZABLE USER INTERFACE

CROSS-REFERENCE TO RELATED APPLICATIONS

This application is a continuation of U.S. patent application Ser. No. 16/663,752, entitled "Financial Management System and Method for Customizable User Interface," filed on Oct. 25, 2019, which is a continuation of U.S. patent application Ser. No. 13/612,673, entitled "Financial Management System and Method for Customizable User Interface," filed on Sep. 12, 2012, now U.S. Pat. No. 10,460,379, which is a divisional of U.S. patent application Ser. No. 12/871,768, entitled "Financial Management System and Method," filed on Aug. 30, 2010, which claims the benefit of and priority to U.S. Provisional Patent Application No. 61/238,567, entitled "Financial Management System and Method," filed on Aug. 31, 2009, and is related to U.S. application Ser. No. 12/324,637, entitled "System and Method for Data Management and Financial Budgeting," filed on Nov. 26, 2008, each of which is incorporated herein by reference in their respective entireties and for all purposes.

BACKGROUND

The present disclosure relates to systems and methods of financial management, and more specifically, to systems and methods that facilitate account management and financial planning for individuals and other entities (e.g., small businesses, etc.).

Individuals and other entities often rely on computer-based systems for different types of financial planning, including budgeting, spending tracking, and so on. However, many existing computer-based systems are cumbersome to use and have limited capabilities regarding the types of financial planning and account management services offered.

It would be advantageous to provide an improved system and method for financial planning and account management for individuals, small businesses, and other users that overcame the disadvantages of existing systems.

SUMMARY

One embodiment relates to a computer-implemented data processing system comprising a data storage device; and a processor and program logic stored in memory and executable by the processor, the program logic including account management logic coupled to the data storage device and configured to manage accounts respectively associated with a plurality of users, the account management logic including account processing logic configured to process transactions for the accounts and store account data related to the accounts in the data storage device; and interface logic coupled to the account management logic and the data storage device, the interface logic configured to connect the data processing system to computing systems associated with the plurality of users by way of the Internet, the interface logic providing the plurality of users with web access to an on-line banking area of a website of a financial institution, the interface logic further configured to establish a connection with one of the users and provide the user with a user interface, the user interface including selected ones of a plurality of display modules provided on a single display page, each display module being associated with one of a plurality of services offered by the financial institution, each of the display modules displaying financial data that is based on account data stored in the storage device for accounts associated with the user; wherein the user interface is customizable based on inputs received from the user to provide the selected ones of the plurality of display modules.

Another embodiment relates to a computer-implemented data processing system comprising a data storage system; and a processor and program logic stored in memory and executable by the processor, the program logic including account management logic coupled to the data storage system and configured to manage accounts respectively associated with a plurality of users, the account management logic including account processing logic configured to process transactions for the accounts and store account data related to the accounts in the data storage device; cash flow planning logic coupled to the account management logic and the data storage device, the cash flow planning logic configured to access the account data stored in the data storage system and determine projected cash flows and projected account balances through a future point in time for each of the users based on accessing the account data in the data storage system; and interface logic coupled to the cash flow planning logic and configured to establish a connection with one of the users and provide the user with a user interface, the user interface including a representation of the projected cash flows and the projected account balances through the future point in time for the user.

Another embodiment relates to a computer-implemented data processing system comprising a data storage system; and a processor and program logic stored in memory and executable by the processor, the program logic including account management logic coupled to the data storage system and configured to manage accounts respectively associated with a plurality of users, the account management logic including account processing logic configured to process transactions for the accounts and store account data related to the accounts in the data storage device; retirement planning logic coupled to the account management logic and the data storage system, the retirement planning logic configured to access the account data stored in the storage device and determine projected retirement spending amounts for a user based on account data associated with the user, the retirement logic further configured to determine a projected required savings amount based on the projected retirement spending amounts; and interface logic coupled to the retirement planning logic and configured to establish a connection with one of the users and provide the user with a user interface, the user interface including retirement planning data, the retirement planning data including an indication of the user's progress in accumulating the projected required savings amount.

Another embodiment relates to a computer-implemented data processing system comprising a data storage system; and a processor and program logic stored in memory and executable by the processor, the program logic including account management logic coupled to the data storage system and configured to manage accounts respectively associated with a plurality of users, the account management logic including account processing logic configured to process transactions for the accounts and store account data related to the accounts in the data storage device; budget logic coupled to the account management logic and configured to determine budget spending amounts for a user for a plurality of categories, the budget logic further configured to identify a surplus cash flow amount for the user; debt management logic coupled to the account management logic and the data storage system, the debt management logic configured to access the account data stored in the storage device; determine an amount of debt owed by the user based on accessing the account data stored in the storage device; and establish a debt payment plan for the user configured to permit the user to pay off the amount of debt over a period of time, the debt payment plan including projected periodic debt payments determined based on the account data and the surplus cash flow amount for the user; and interface logic coupled to the debt payment logic and configured to establish a connection with the user and provide the user with a user interface, the user interface including debt payment data associated with the debt payment plan, the debt payment data configured to permit the user to track the user's progress over time in making the periodic debt payments to pay off the amount of debt owed by the user.

BRIEF DESCRIPTION OF THE DRAWINGS

FIG. 5 is a screen display that may be provided to a user to permit the user to view a calendar view of future balance and cash flow projections according to an exemplary embodiment.

FIG. 11 is a screen display that may be provided to a user to permit the user to view and edit budgeting data according to an exemplary embodiment.

FIG. 12 is a screen display that may be provided to a user to permit the user to set up and modify various alerts according to an exemplary embodiment.

DETAILED DESCRIPTION OF EXEMPLARY EMBODIMENTS

Figure 1:
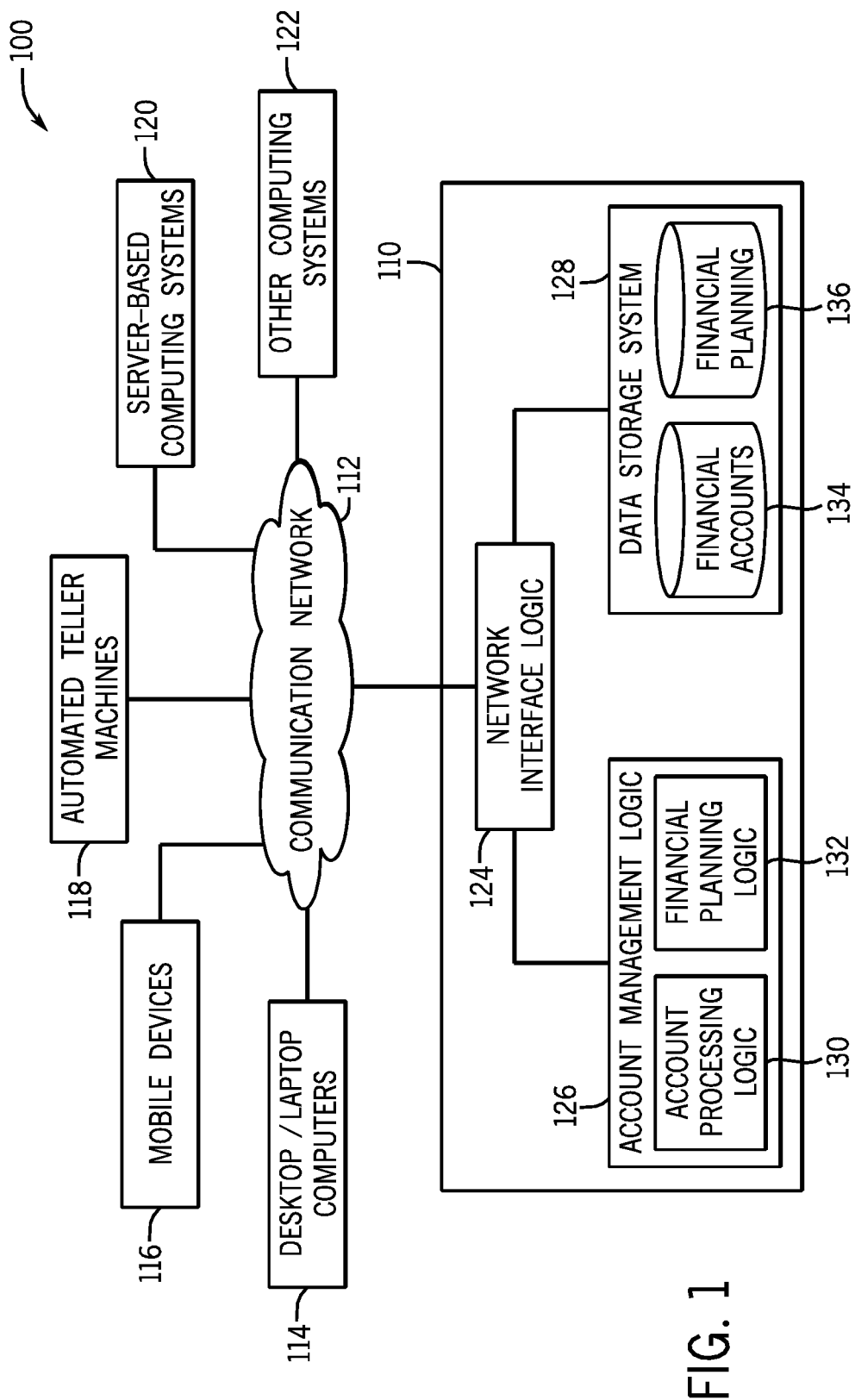
FIG. 1 is a block diagram of a data processing system according to an exemplary embodiment.

Referring to FIG. 1, a data processing system 100 according to an example embodiment is shown. The data processing system 100 includes a system 110 that may be accessed by various users and used to process financial transactions for users. For example, system 110 may be used for financial planning purposes such as viewing savings, budget, or spending reports, viewing cash flow projections, retirement planning, repaying debt, and so on. The users may access data processing system 110 using a variety of computing systems 114-122. Computing systems 114-122 may access system 110 through a communication network 112 which may, for example, include the Internet, telephone networks, wireless networks, point-to-point networks, and/or other networks.

Computing systems 114-122 may include computers 114 such as laptop or desktop computers that are accessible to individual users, such as home computers, work computers, public computers, and so on. Computers 114 may be used by the users to access system 110, for example, via the Internet. For example, computers 114 may be used to import data from and export data to local storage (e.g., hard drive, memory stick, CD ROM, etc.). Likewise, computing systems 114-122 may also include other devices such as mobile computing devices 116 (e.g., cell phones, mobile e-mail devices, mobile short message service (SMS) devices, and so on) that may be used to import data into and export data out of system 110.

In an example embodiment, system 110 is provided by a financial institution, and the users are customers of the financial institution that access system 110 through an on-line account area of a website of the financial institution. For example, system 110 may be provided by a bank, and the users may be customers of the bank that access system 110 through an on-line banking area of a website of the bank. System 110 may be provided as an enterprise computing system that provides account management and financial planning services in addition to a variety of other services for users internal and external to the bank. In such an embodiment, the financial planning services provided by the financial institution may include savings planning, on-line/automatic bill payment, spending and/or budget reports, cash flow planning, on-line checking, and similar services. Such an arrangement is described in greater detail below.

Computing systems 114-122 may include server-based computing systems 120, which may include, for example, enterprise computing systems associated with other business entities. For example, where a user pays bills to businesses electronically (e.g., on-line payment of utility bills, credit card bills, telephone bills, cable bills, and so on), computing systems 120 may be computer systems operated by the business to generate the bills and to process the user's accounts. Electronic bills may be received from such businesses and stored in system 110 (e.g., the complete bill, the bill in summary form, etc.). As another example, computing systems 120 may be associated with vendors to whom billing and collection operations are outsourced by other companies. As another example, computing systems 120 may be associated with entities that publish RSS (Really Simple Syndication) feeds, and the user may use system 110 to store RSS feeds such as blog entries, news headlines, and podcasts. As another example, computing systems 120 may be associated with entities that allow for on-line ordering of products. Other computing systems 122 may also be provided.

Referring further to FIG. 1, system 110 may include network interface logic 124, account management logic 126, and a data storage system 128. Such logic may, in practice, comprise a processor (e.g., a single microprocessor, a connected network of microprocessors/servers, etc.) and program instructions that are stored in memory and that are executed by the processor.

Network interface logic 124 may be used to establish connections with computing systems 114-122 and permits users to access accounts and account data in system 110 by way of network 112. For example, in the context of desktop/laptop computers 114, network interface logic 124 may comprise one or more web servers that provide a graphical user interface (e.g., a series of dynamically-generated web pages or screen displays) for users that access system 110 through the web. The graphical user interface may be used to provide users with access to a variety of services offered by a financial institution, as discussed in greater detail herein. Network interface logic 124 may also comprise other logic that is configured to provide an interface for other types of devices such mobile computing devices 116, ATMs 118, and server-based computing systems 120.

As indicated above, in an example embodiment, system 110 is provided by a financial institution and is accessible through an on-line account area of a website of the financial institution. In such an embodiment, account management logic 126 may include financial account processing logic 130 and financial planning logic 132. Account processing logic 130 performs account processing to process transactions in connection with the account(s) of an account holder, such as account debits and credits to checking and savings accounts, credits and debits to home mortgage and home equity accounts, credits and debits to student loan accounts, and so on. For example, in the context of checking accounts, the transactions may also include electronic bill payment transactions in which monies from the checking account of the user are used to pay bills received by the user. Financial planning logic 132 provides a variety of financial planning services (e.g., resources, tools, reports, etc.) to users of system 110 to assist users in managing their financial accounts. Financial planning services may include savings plans, spending/budget plans and reports, retirement planning services, debt management services, and so on. Financial planning logic 132 may further include various logic components that facilitate the generation of a variety of reports, etc., by tracking fund transfers, bill payments, check deposits, etc.

As discussed above, in an exemplary embodiment, system 110 may include a data storage system 128. Data storage system 128 may be configured to store data related to financial accounts 134 (e.g., checking account data, credit card account data, etc.) and various financial planning services 136 (e.g., savings/spending goals, alert preferences, etc.). Data storage system 128 may be accessed by network interface logic 124, account management logic 126, and/or any of the other logic or other components discussed herein. In one embodiment, system 110, and more specifically, data storage system 128, may act as the system of record for the account data for various accounts of different users, and may provide various different types of data to the various logic and other components herein. Utilizing data storage system 128 as the system of record provides definitive values for individual elements of data or information, and avoids discrepancies or other errors in such data that may occur, for example, when manually entering account data into financial planning tools that are not integrated with the actual account data.

Figure 2:
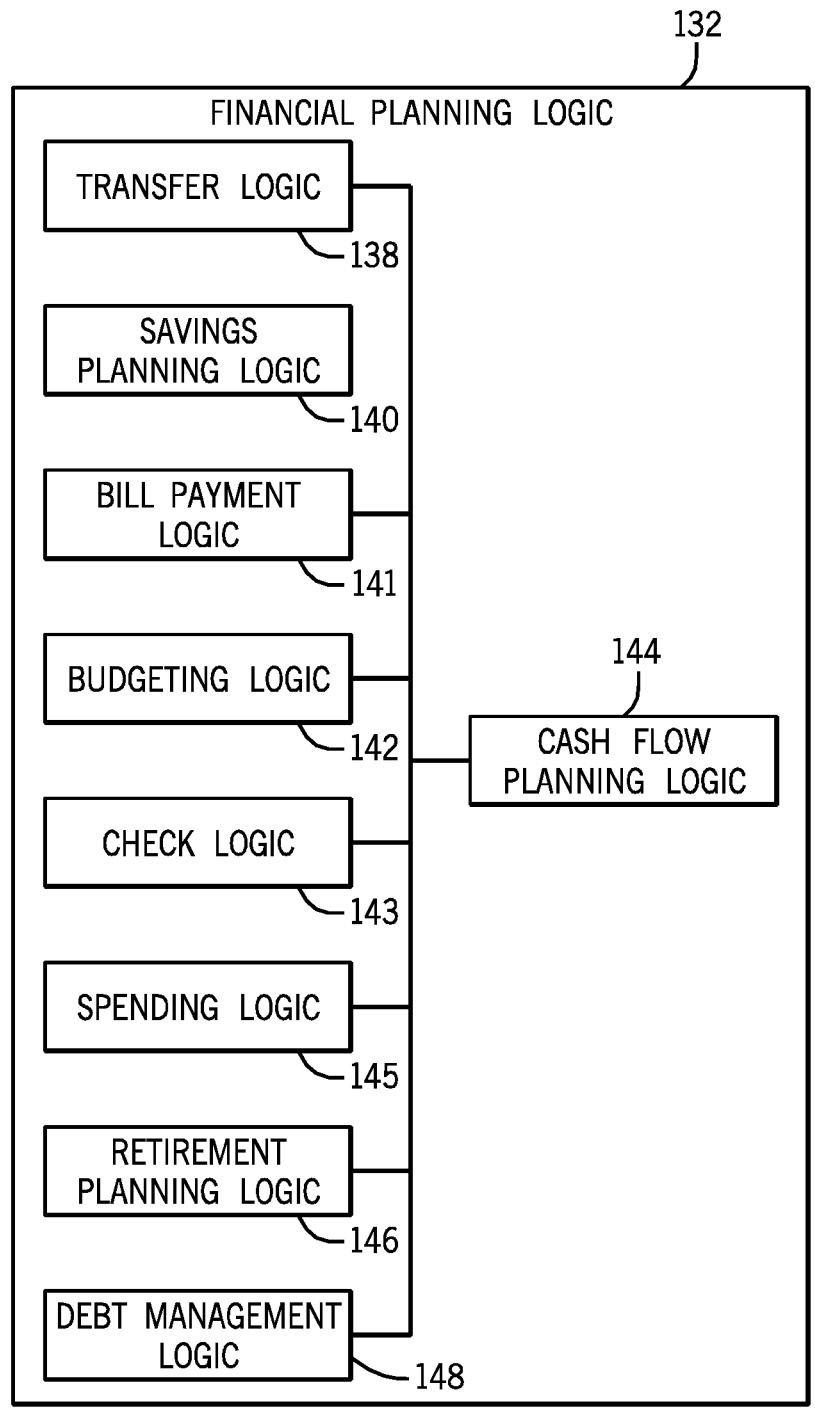
FIG. 2 is a block diagram of the financial planning logic shown in FIG. 1 according to an exemplary embodiment.

Referring now to FIG. 2, financial planning logic 132 is shown in greater detail according to an example embodiment. As shown in FIG. 2, financial planning logic 132 may include transfer logic 138, savings planning logic 140, bill payment logic 141, budgeting logic 142, check logic 143, spending logic 145, retirement planning logic 146, debt management logic 148, and cash flow planning logic 144. According to various alternative embodiments, more or fewer logic components may be provided as part of financial planning logic 132, and certain logic components may be integrated and/or include further discrete logic components relative to those illustrated in FIG. 2.

Transfer logic 138 may be used to track transfers of funds between various user accounts. For example, transfer logic 138 may track the amount of funds transferred, the account from which the funds were transferred, the account to which the funds were transferred, and the date of the transfer. Transfer logic 138 may also enable a user to schedule future fund transfers between accounts. Such transfers may be scheduled on a one-time basis, a recurring basis, etc. Transfer logic 138 may further enable a user to modify scheduled transfers of funds and perform other functions.

Savings planning logic 140 may enable users to set up or manage a savings plan that includes a savings goal (e.g., a specific amount such as $1000, etc.) and, if desired, a target date for reaching the goal. Savings planning logic 140 may monitor a user's progress in meeting one or more savings goals, and may provide periodic updates, alerts, etc. to the user. Further, a user may establish and label different savings plans (e.g., vacation, school tuition, etc.) and track each plan individually. Savings planning logic 140 may further interface with transfer logic 138 to enable automatic transfers to one or more savings accounts to facilitate the savings process.

Bill payment logic 141 may enable users to pay one or more bills electronically and/or automatically. For example, a user may specify a payee to whom a payment is to be sent, the date on which the payment is to be sent, and the amount of the payment. Bill payment logic 141 may then provide payment to the payee according to the user-provided parameters. Automatic payments may be made periodically (e.g., on a monthly basis) should a user have a recurring payment of a single amount (e.g., a set loan payment amount). Further, bill payment logic 141 may track both past bill payments and future, projected bill payments.

Budgeting logic 142 may enable a user to set up and utilize a budget report or plan. For example, a user may define or select categories for various transaction types and/or merchants such that a user may create a report that includes current and/or past spending data organized by category. As such, budgeting logic 142 may enable a user to set up budget spending amounts for each category. The budget spending amounts may be prepopulated based on average historic spending amounts of each category, and the budget amounts may alternatively be entered and/or modified by the user. Other features of budgeting logic 142 are discussed in further detail with respect to FIG. 11.

Check logic 143 may track checks written against one or more checking accounts of a user, including check amounts, check dates, and other relevant information. Furthermore, in some embodiments, check logic 143 may provide links to images of checks such that a user may view an image of the actual written check. Check logic 143 may track data on an aggregated basis over several checking accounts, or alternatively, may enable a user to view data for a single checking account.

Spending logic 145 may be used to set up and/or utilize a spending summary or report, and/or to identify discretionary spending amounts (e.g., entertainment, etc.) of a user. Spending logic 145 may enable a user to categorize various types of user transactions (e.g., credit card purchases, etc.) by transaction categories (e.g., by merchant type, etc.) and view a spending summary such as that shown in FIG. 11 and discussed in further detail below. Spending logic 145 may further be used to identify potential sources of additional savings for a user (e.g., should a user be looking for savings opportunities in order to pay off personal loans or other debt, etc.). In some embodiments, discretionary spending amounts may be identified based on categorizations of transactions in connection with spending logic 145 and budgeting logic 142. Spending logic 145 may further provide a user with status reports or alerts advising the user of, for example, an unusual increase in spending during a specific time period (e.g., a current month, etc.). Further yet, spending logic 145 may be configured to provide the user with advice or tips on how to reach various financial goals.

Retirement planning logic 146 may be used to generate retirement plans for users. In some embodiments, retirement planning logic 146 may be used both during the pre-retirement, or accumulation period, of a user, as well as during actual retirement, as a retirement management tool. As discussed in further detail with reference to FIGS. 7-9, retirement planning logic may assist users in establishing and monitoring retirement savings goals, retirement spending trends, and so on.

Debt management logic 148 may be used in connection with reducing the debt of a user. In some embodiments, debt management logic 148 may track one or more loans (e.g., personal loans, home loans, etc.) or other payment obligations (e.g., credit card payments due, etc.) and assist a user in establishing a plan for reducing and/or eliminating one or more sources of debt. As discussed in further detail with reference to FIG. 10, debt management logic 148 may assist users in consolidating debt, establishing and managing a debt payment plan, and monitoring the progress of a debt payment plan.

Cash flow planning logic 144 may be used to provide past, current, and/or projected cash flow data. For example, in some embodiments, cash flow planning logic 144 may interface with the various other logic components shown in FIG. 2 to provide users with an overall cash flow analysis based on various past and projected cash flows, including fund transfers, bill payments, spending transactions, and so on. As discussed in further detail with reference to FIGS. 4-6, cash flow planning logic 144 may enable users to monitor and adjust cash flows to maintain one or more desired account balances in a number of user accounts.

Figure 3A:
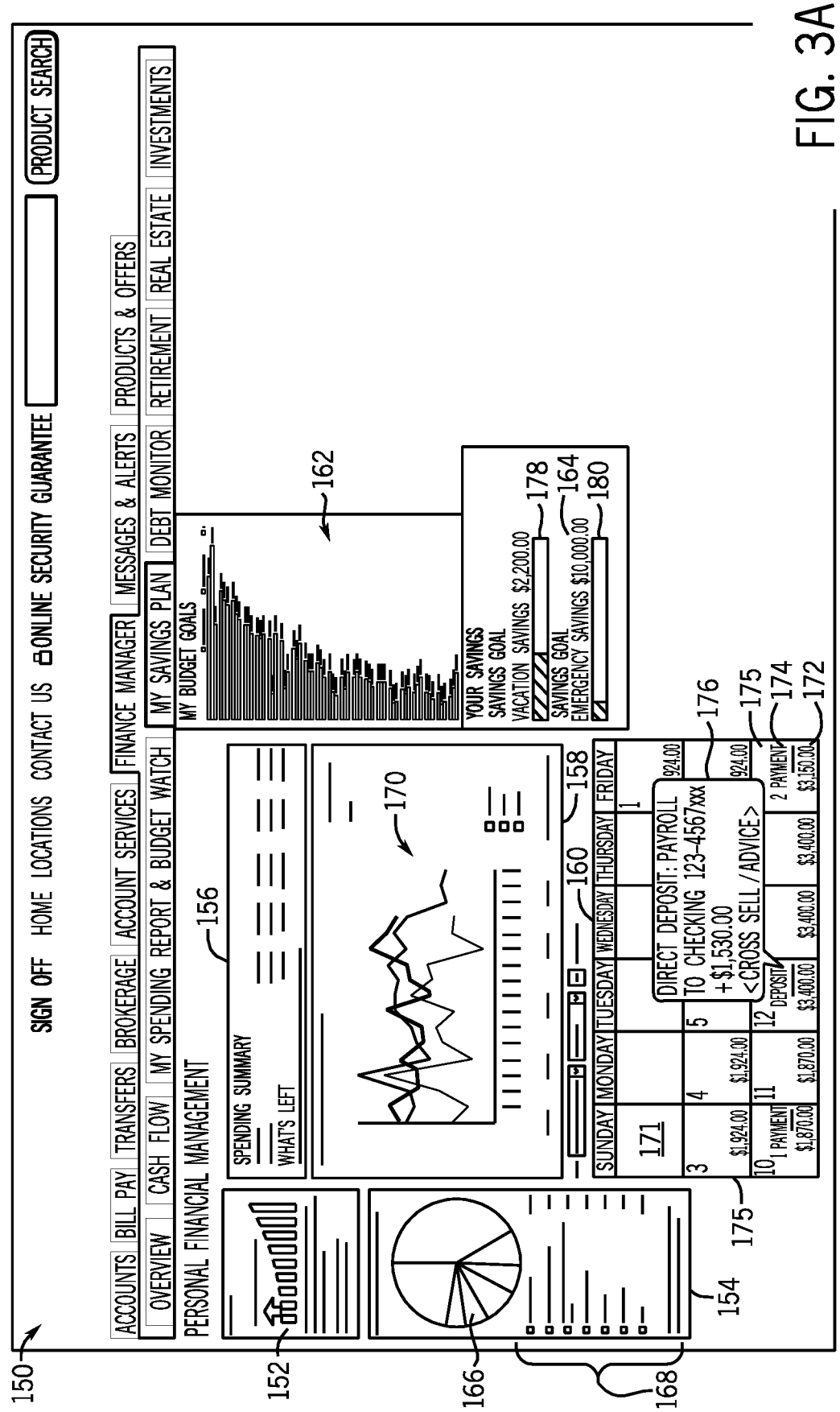
FIG. 3A is a screen display that may be provided to a user to permit the user to view a variety of financial account data according to an exemplary embodiment.

Referring now to FIG. 3A, according to an exemplary embodiment, network interface logic 124 may be configured to provide a user with a screen display 150. As shown in FIG. 3A, screen display 150 may provide users with a "snapshot" of various financial accounts, reports, etc. (e.g., a personal financial management "dashboard" or "landing page"). In some embodiments, users may be required to log on or otherwise register to obtain access to an on-line banking area of a financial institution, and screen display 150 may be the first screen display provided to users after being properly logged on and/or registered. Screen display 150 is intended to provide users with a summary of various account information, reports, progress/status alerts, and so on. Network interface logic 124 may interface with account management logic 126 to provide screen display 150, including interfacing with various logic components of financial planning logic 132. For example, in some embodiments, one or more of the logic components of financial planning logic 132 may be configured to generate or provide various display portions, or display modules, as part of screen display 150. For example, as shown in FIG. 3A, screen display 150 may include a number of modules 152-164 (e.g., display modules or portions, images, etc.), including a savings planning module 152, a graphical spending summary module 154, a textual spending summary module 156, a graphical cash flow module 158, a calendar cash flow module 160, a budget analysis module 162, and a savings status module 164.

Savings planning module 152 may be or include one or more links to savings plans for an individual user. Savings plans may be established for individual goals (e.g., a new home purchase, a car purchase, school tuition, etc.), and the progress toward each goal may be tracked individually by savings planning logic 140.

Graphical spending summary module 154 may include a graphical representation of spending trends for a user. For example, a chart 166 such as a pie chart, a bar chart, or other suitable chart or graph may be used to provide the user with a graphical representation of the user's spending. In some embodiments, chart 166 may include, for example, the top ten spending categories for a user over a specific time period. In other embodiments, chart 166 may include user-identified spending categories such that a user may configure chart 166 to include desired categories of spending. A key 168 may provide actual spending amounts for chart 166.

Textual spending summary module 156 may include a textual listing of total inflows, total outflows, and the net cash flow (positive or negative) for one or more time periods, including a current time period (e.g., a month-to-date). In addition, spending summary module 156 may take into account budgeted cash flows and provide overall budgeted cash inflows and outflows, and further may provide an "over" or "under" amount that reflects a user's actual spending/savings versus budgeted amounts. For example, module 156 may include inflows and outflows for two previous months, current, month-to-date inflows and outflows, budgeted inflows and outflows for the current month, and the current over/under amounts for the cash inflows and outflows. Spending summary 156 may assist users in identifying "what's left" with respect to a user's net monthly cash flows (e.g., any positive net cash flow amounts over a given period), which may in turn assist a user in identifying sources of additional savings for various individual savings plans, debt payment plans, retirement plans, etc.

Graphical cash flow module 158 may provide a graphical representation of cash flows of a user. For example, module 158 may include a line graph 50 showing the amounts of various cash flows such as expenses, income, and transfers over a period of time (e.g., one week, one month, etc.). Module 158 may further provide a line graph of a user's net cash flow over time. In some embodiments, module 158 may be selectable (or include a selectable link) to direct a user to additional details regarding the user's cash flows.

Calendar cash flow module 160 may provide information similar to graphical cash flow module 158, but in a calendarized format. For example, as shown in FIG. 3A, module 160 may present a number of individual days 171 as part of a calendar 175. A balance amount 172 may be provided as part of each individual day 171, and historic or projected cash flows 174 may be provided on appropriate days. In some embodiments, individual cash flows 174 may include or be links that are selectable to provide additional data regarding the cash flow. For example, as shown in FIG. 3A, a display portion 176 (e.g., a screen display, a pop-up image, an overlay image, etc.) may provide the details of an individual transaction provided as a cash flow 174 on calendar 175. As discussed in greater detail with respect to FIGS. 4-6, module 160 may enable a user to add or remove transactions or other cash flows, or even reschedule transactions (e.g., by dragging and dropping a scheduled transaction from one day to another day) in order to maintain a minimum balance, etc.

Budget analysis module 162 may include status reports, alerts, and/or other messages regarding one or more budgets of the user. As shown in FIG. 3A, module 162 may include a graphical comparison of actual spending amounts versus budgeted spending amounts for a variety of transaction categories over a period of time such as one month, one year, etc. Alternatively, budget analysis module 162 may provide data in a textual format, including actual spending amounts, budgeted spending amounts, and over/under values indicating the amounts by which the actual spending amounts are over and/or under the budgeted amounts. Other budget information may further be provided, and module 162 may further include a link to a more detailed budget report, such as that shown in FIG. 11.

Savings status module 164 may provide a user with a status or progress of the user in relation to one or more savings goals such as vacation savings, emergency savings, etc. For example, as shown in FIG. 3A, module 164 includes a status bar 178 that may be a status bar that indicates via shading, highlighting, etc., the user's progress toward a savings goal for a vacation. Similarly, a status bar 180 may indicate a user's progress toward a savings goal for an emergency savings fund. More or fewer status bars may be provided, and the status bars may further provide an indication of whether a user is on track to meet a savings goal by a specified date (e.g., by providing an indication that the user is ahead of/behind schedule to meet a particular savings goal by a specific date). Module 164 may further include one or more additional links to additional information such as creating another savings plan, identifying additional sources of savings, and so on.

Other modules may be provided in addition to those illustrated in FIG. 3A, including a debt management module (e.g., for displaying the status of a debt payment plan), a credit management module (e.g., for displaying a credit score, credit report, etc.), a retirement planning module (e.g., for displaying the status of a retirement savings plan, a retirement management plan, etc.), a real estate module (e.g., for displaying data related to real estate investments), a net worth module (e.g., for providing an estimated net worth of an individual), an advice and guidance module (e.g., for providing tips and advice regarding financial planning, etc.), a messages and rewards modules (e.g., for providing messages and/or rewards indications to users), and so on.

According to an exemplary embodiment, network interface logic 124 may be configured to provide different, customized views of screen display 150 to different users, such that for each user, different modules may be displayed as part of screen display 150. Screen display 150 may be customized based upon, for example, a user indicating which modules the user wishes to be able to view as part of screen display 150. Alternatively, screen display 150 may be customized based on the activity of the user at a financial institution (e.g., based on the types of accounts the user has open, the types of financial planning services the user is currently utilizing and/or not utilizing, the age of the user (e.g., how close to retirement), the type and how much debt the user currently has, and so on). Further, network interface logic 124 may enable users to rearrange modules on screen display 150 (e.g., by dragging and dropping modules, etc.). Other ways of customizing screen display 150 may be used according to various other exemplary embodiments.

Providing a screen display such as screen display 150 is intended to provide a brandable summary (e.g., with the logo, trademark, etc, of a financial institution such as a bank, etc.) of financial account and financial planning data for users that may be customized according to user preferences or other parameters. Such a screen display may enable smarter and more timely financial decisions, provide users with insight into their financial profile, enable users to learn basic financial skills and financial best practices, and assist users in achieving financial goals through monitoring, alerting, forecasting, and encouraging financial discipline. According to an exemplary embodiment, modules 152-164 may be generated and/or periodically updated based on data retrieved from data storage system 128. For example, in one embodiment, modules 152-164 may be updated on a daily basis. In other embodiments, modules 152-164 may be updated more or less frequently.

Referring further to FIG. 3A, any of modules 152-164 may be or include a link configured to direct a user to additional information or details regarding the subject matter of the specific module. For example, should a user select a link associated with budget analysis module 162, the user may be directed to a detailed budget report (such as the one shown in, e.g., FIG. 11) having additional detail than that provided by way of, for example, budget analysis module 162. As an additional example, should a user select a link associated with calendar cash flow module 160, the user may be directed to a screen display that includes an enlarged and/or more detailed view of a calendar cash flow view, an exemplary embodiment of which is provided in FIG. 5. In some embodiments, a user may move a cursor or similar item across display 150, and user interface logic 124 may be configured to highlight the specific module that the cursor is currently positioned on.

Figure 3B:
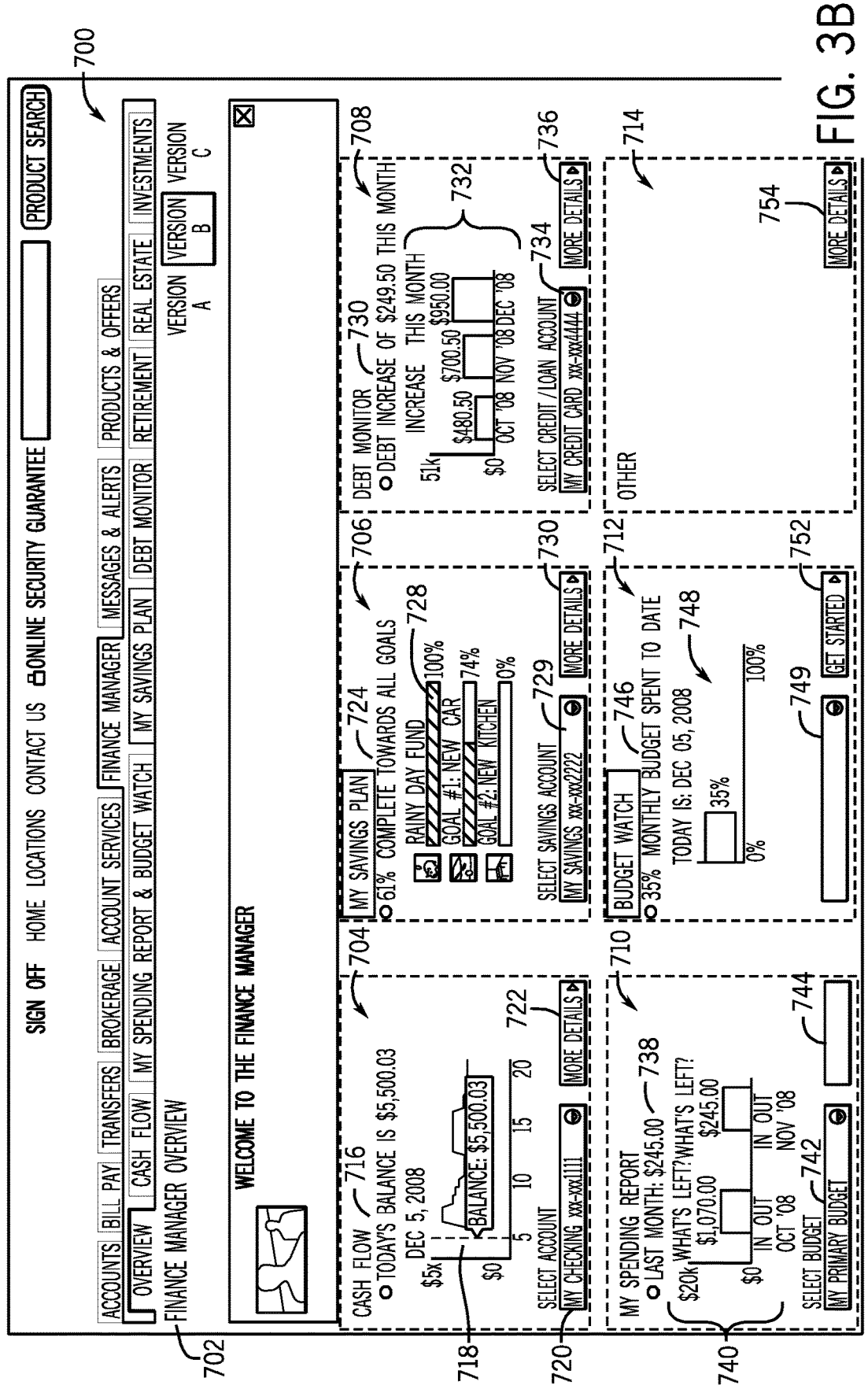
FIG. 3B is a screen display that may be provided to a user to permit the user to view a variety of financial account data according to another embodiment.

Referring now to FIG. 3B, a screen display 700 is shown according to an example embodiment. Screen display 700 may be similar to display 150 in many regards, in that display 700 may provide the user with a number of "modules," such as modules 704-714 (e.g., display areas or portions, images, icons, etc.). For example, as shown in FIG. 3B, display 700 includes a cash flow module 704, a savings plan module 706, a debt monitor module 708, a spending report module 710, and a budget module 712. Other modules 714 may also be included (e.g., a retirement planning module, a real estate module, an investments module, etc.).

According to one embodiment, display 700 may be configurable by a user such that a user may add, remove, and rearrange the various modules. For example, the modules shown as part of display 700 may be provided based on inputs received from a user (e.g., via a user profile page that is populated by the user, etc.). Further, display 700 may include a "drag and drop" feature such that the modules may be rearranged by a user by the user selecting a given module and moving the module to a new position on display 700. Alternatively, an "auto-arrange" feature may be selected by a user such that the modules of display 700 are arranged automatically according to certain criteria (e.g., user preferences, account activity of a user or user spending/savings habits, etc.).

Cash flow module 704 may include a status field 716, a graph 718 that includes historical account balance data, and an option 720 that enables a user to select one or more accounts to be represented in status field 716 and/or graph 718. An option 722 may enable a user to view additional details regarding the user's cash flow. Status field 716 may provide a current balance for one or more accounts, or alternatively, may indicate that a user has overdrawn an account by a certain amount. Further yet, status field 716 may provide an alert indicating that according to projected cash flows, a user may be overdrawn a certain amount as of a future date in time. As shown in FIG. 3B, graph 718 provides both historical and projected cash flows, in addition to identifying the current balance. In some embodiments, a user may select various portions of graph 718 (e.g., by moving a cursor along a line of the graph) and may be provided with the current balance of the day corresponding to a selected portion of the graph. Furthermore, option 720 is configured to enable a user to select different accounts to be represented within module 704.

Savings plan module 706 may include a status field 724, one or more savings graphs 728, an account selection option 729, and a more details option 730. Status field 724 may provide the status of a user's progress toward reaching one or more savings goals. For example, as shown in FIG. 3B, status field 724 indicates that a user has reached 61% of the user's total savings goals. Graphs 728 may provide a bar or other type of graph that provides a graphical representation of a user's progress toward a specific goal (e.g., a rainy day fund, a new car goal, a new kitchen goal, and so on). For example, while status field 724 indicates that the user has saved 61% of all savings goals, graphs 728 provide a breakdown regarding specific goals (e.g., 100%, 74%, and 0%, respectively, as shown in FIG. 3B). A graphical indicator (e.g., a picture, image, icon, etc.) may be provided adjacent one or more of graphs 728 to provide a pictorial representation of the goal (e.g., a piggy bank representing a rainy day fund, a picture of a car representing a new car goal, and so on).

Debt monitor module 708 may include a status field 730, a graph 732, an account selection option 734, and a more details option 736. Status field 730 may indicate, for example, a current increase or decrease in the user's debt level for the current month. Graph 732 may provide current and/or historic debt information for a user (e.g., individual or aggregated amounts owed for one or more credit card accounts, loan accounts, etc.). As shown in FIG. 3B, graph 732 includes a separate bar for each month, and provides the total debt for each month. Account selection option 734 permits the user to add or remove accounts to be represented by debt monitor module 708. More details option 736 enables a user to access additional data regarding the user's debt and related information.

Spending report module 710 may include a status field 738, a graph 740, a budget selection option 742, and a more details option 744. Status field 738 may provide an indication of the net cash flow of the user for the most recent past month (e.g., as "What's Left" between cash in flows and cash out flows). For example, as shown in FIG. 3B, status field 738 indicates that the user took in $245 dollars more than what the user spent over the course of the previous month. Graph 740 may provide a pictorial representation of similar data, showing a comparison of cash in flows and cash out flows, and further providing the difference between these values (e.g., "What's Left"). More details option 744 enables a user to access additional spending data and related information.

Budget watch module 712 may include a status field 746, a graph 748, a budget selection option 749, and a more options field 752. Status field 746 may indicate the amount the user has spent in the current month relative to the user's total spending budget for the month. For example, as shown in FIG. 3B, status field 746 indicates that the user has spent 35% of the current month's budget. Graph 748 may provide similar data, for example, by way of a bar chart that indicates a percentage of the total month's budget spent to date. According to an alternative embodiment, budget watch module 712 may show actual spending/budget amounts instead of or in addition to the percentages shown in FIG. 3B. Budget selection option 749 may enable a user to specify one or more accounts to be represented by budget watch module 712. More details option 752 enables a user to view additional budget data and related information.

As mentioned previously, other modules 714 may be provided in accordance with various alternative embodiments, and may be provided automatically based on criteria such as a user profile, user spending/savings habits, user preferences, and so on.

Figure 4:
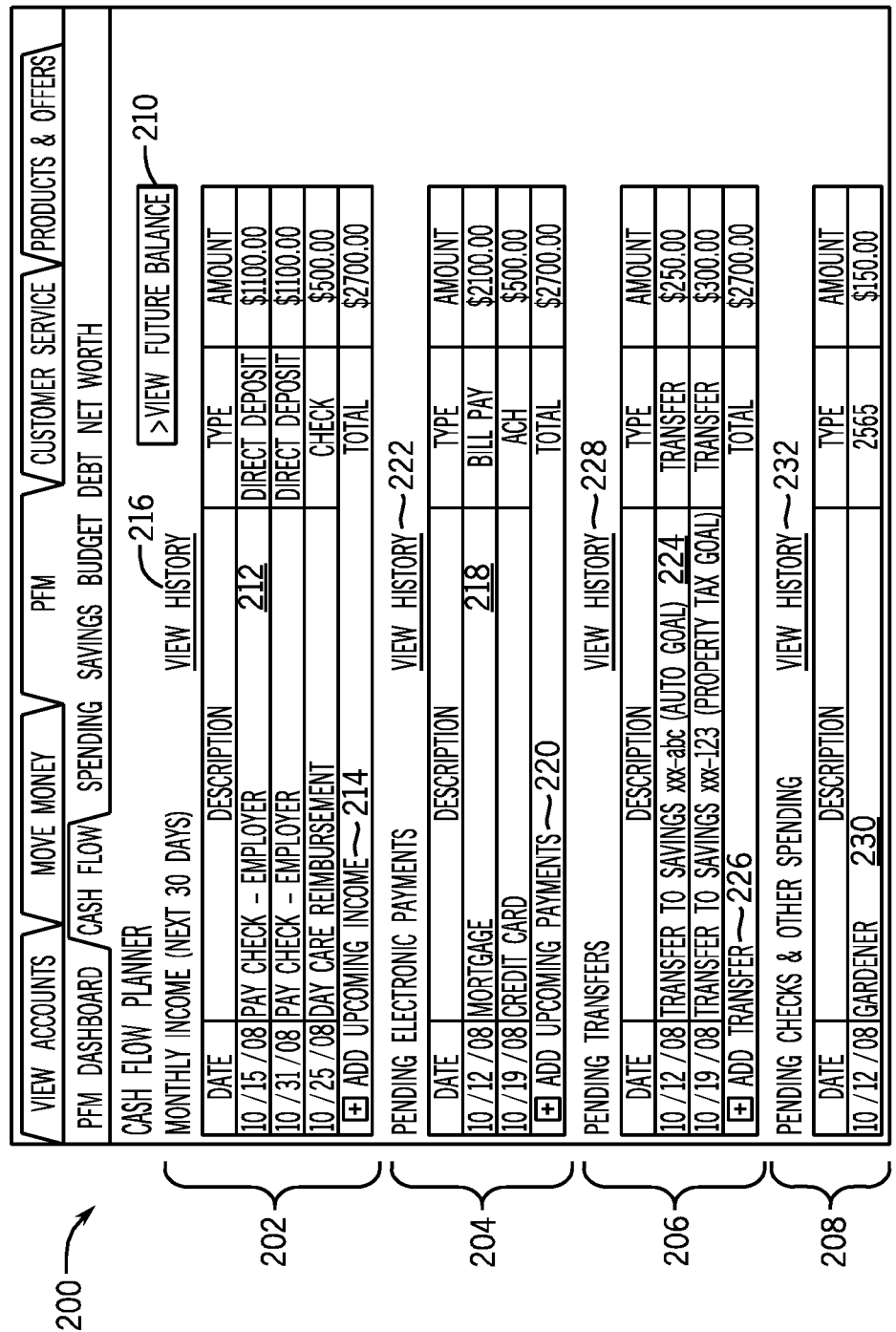
FIG. 4 is a screen display that may be provided to a user to permit the user to view cash flow planning data according to an exemplary embodiment.

Referring now to FIG. 4, a screen display 200 is shown according to an exemplary embodiment. Screen display 200 may be generated by network interface logic 124 and/or cash flow planning logic 144, and may provide a user with a "Cash Flow Planner" intended to present a summary view of various pending cash flows such as income, electronic payments, transfers, checks, and so on. For example, as shown in FIG. 4, screen display 200 may include an income summary 202, a pending electronic payments summary 204, a pending transfers summary 206, and a checks and other spending summary 208. Summaries 202-208 are intended to provide users with summarized data related to various types of cash flows, and may include total cash flow amounts for each summary section indicating a total cash flow over a period of time. In some embodiments, the time period over which summary data is provided may be a future time period, a historic time period, or a combination of future and historic time periods.

According to an exemplary embodiment, income summary 202 may include one or more transactions or cash flows 212. Each transaction 212 may include information such as a date, a description, a transaction type, and a transaction amount. Income summary 202 may further include a link 214 that permits a user to add additional transactions (e.g., cash flows in the form of income, etc.) and a link 216 that permits a user to view historic cash flow data. For example, should a user desire to add or modify one or more transactions, a user may provide transaction details such as a source/destination account number or identifier, one or more recipients, an amount, a date, etc. Summaries 204, 206, 208 may be similar to summary 202, and may each include one or more transactions or cash flows 218, 224, 230, links 220, 226, and/or links 222, 228, 232, respectively.

Screen display 200 may further include a link 210 that may direct a user to one or more reports, graphs, or other information that includes future balance information for one or more accounts of the user. Example embodiments of screen displays that may be provided or generated by cash flow planning logic 144 and/or network interface logic 124, and that may include historic and/or future cash flow and/or account balance data, are illustrated in and discussed in further detail with respect to FIGS. 5-6E.

Figure 5:
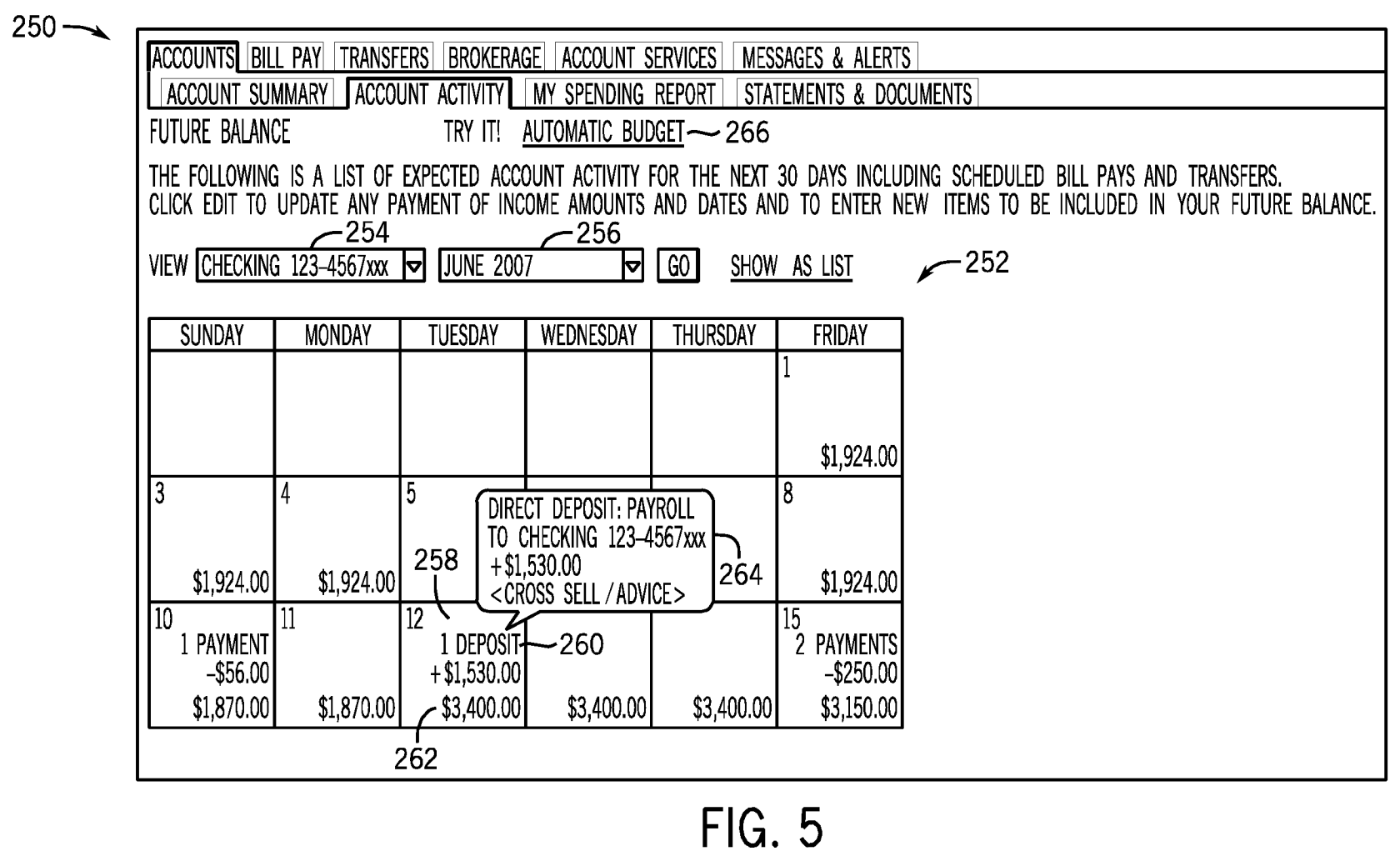

Referring to FIG. 5, a screen display 250 is shown according to an exemplary embodiment. Screen display 250 may be a "Future Balance" view for a user and may include a calendar 252 that presents projected cash flows and projected account balances for a selected account 254 over a selected time period 256. According to various alternative embodiments, account 254 and/or time period 256 may be selected by a user or may be pre-selected by network interface logic 124 and/or cash flow planning logic 144. Furthermore, data from one or more accounts may be combined and presented using screen display 250 (e.g., by use of a drop-down or other menu that permits a user to identify multiple accounts to be included in the view).

As shown in FIG. 5, calendar 252 may include a number of individual days 258 presented in a conventional or other calendar format. Various cash flows 260 may be displayed on the appropriate days 258 (e.g., on the day the cash flow is scheduled to occur, such as a direct deposit from a payroll, a transfer, etc.). Each day 258 may further include a projected account balance 262 that reflects the cash flows up to and including that date. In some embodiments, negative account balances and/or any cash flows that result in a negative account balance may be presented so as to capture the attention of a user (e.g., via highlighting, a bold or relatively larger font, a different color font, underlining, etc.). According to an exemplary embodiment, projected cash flows 260 and/or projected account balances 262 may be or include selectable links configured to provide a user with additional details upon selection by a user. For example, should a user select cash flow 260, a display or image 264 (e.g., a pop-up display, an overlay image, etc.) may be provided that includes information such as the type of transaction, an account number, or even additional links to further information and/or advice.

According to an exemplary embodiment, screen display 250 may be configured to permit a user to move scheduled cash flows between individual days. For example, should a user determine that a particular transaction such as a scheduled transfer of funds out of a particular account will cause the account balance for that account to become negative, the user may choose to reschedule the transaction by moving (e.g., dragging and dropping, entering a new date into a text box, etc.) the transaction from one day to another day (e.g., to a later date after a positive inflow of cash such as a direct deposit from a payroll, etc.). Upon the user moving one or more cash flows to different days 258 on calendar 252, cash flow planning logic 144 may recalculate the daily account balances and provide an updated version of calendar 252, such that a user may confirm, for example, that any projected negative account balances have been eliminated.

Figure 6A:
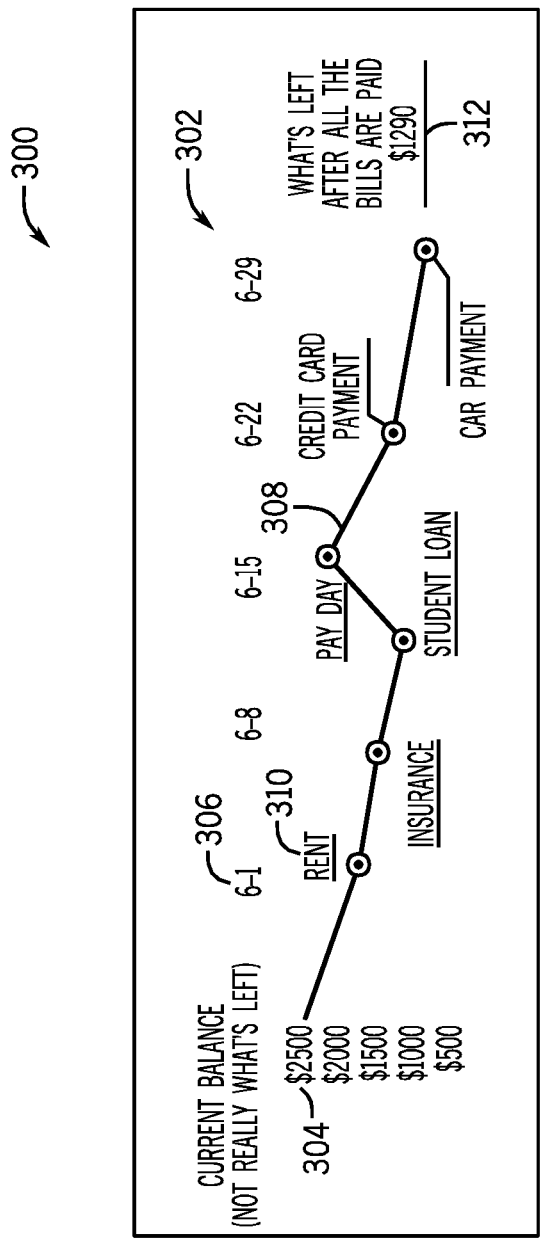
FIG. 6A is a screen display that may be provided to a user to permit the user to view a graph view of future balance and cash flow projections according to an exemplary embodiment.

Referring to FIG. 6A, a screen display 300 is shown according to an exemplary embodiment. Screen display 300 may provide the user with a graph (e.g., a line graph, a bar chart, etc.) such as line graph 302 that provides the user with a graphical representation of cash flows and/or account balances of a user. For example, graph 302 may provide account balance values 304 along one axis (e.g., the y-axis) and dates 306 along a second axis (e.g., the x-axis). A line 308 may show how various cash flows impact the account balance over time. Graph 302 may further include a number of indicators 310 that include an indication (e.g., an icon, graphical indication, display image, etc.) of the type of cash flow or transaction that has occurred or is scheduled to occur. Graph 302 enables users to identify the types and amounts of cash flows that impact their account balances over time.

According to one embodiment, graph 302 may be configured to provide data on a monthly basis (e.g., on a calendar month basis, on a 30-day basis, etc.) or for some other period of time. In some embodiments, graph 302 may provide the user with a beginning account balance, or current balance, and an ending account balance 312 for the period of time (e.g., "What's Left After all the bills are paid."). Providing a user with ending account balance 312 may provide the user with insight into whether the user has a net positive or negative cash flow, whether the user has the opportunity to use surplus cash flows in other areas (e.g., retirement planning, debt repayment, specific savings plans, and so on), etc. Further, ending account balance 312 may be accessed by various other logic components in order to automatically identify similar opportunities (e.g., to develop a retirement savings plan, a debt payment plan, a specific savings plan for vacation, etc., and so on).

According to an exemplary embodiment, screen display 300 and graph 302 may be configured (e.g., by cash flow planning logic 144 and/or network interface logic 124) to permit a user to move scheduled cash flows along graph 302 (e.g., between different dates). For example, a user may wish to avoid having a negative balance, so a user may be able to defer certain transactions until a later date. In such a case, a user may select an individual cash flow (e.g., by clicking on, highlighting, etc.) and move (e.g., drag, etc.) the cash flow to a new date. Upon the user moving one or more cash flows, cash flow planning logic 144 may update graph 302, including the account balances, to reflect the rescheduled cash flows.

According to an exemplary embodiment, cash flow planning logic 144 may be further configured to provide one or more alerts to a user. For example, as discussed above, projected account balances may be calculated for a future period of time, and cash flow planning logic may be configured to provide an alert to a user indicating that the account balance is projected to become negative. The alert may be provided in a variety of ways, including email, a text message, SMS (short message service), and so on. An exemplary screen shot enabling users to set up and/or modify a number of user alerts is discussed with respect to FIG. 12.

Figure 6B:
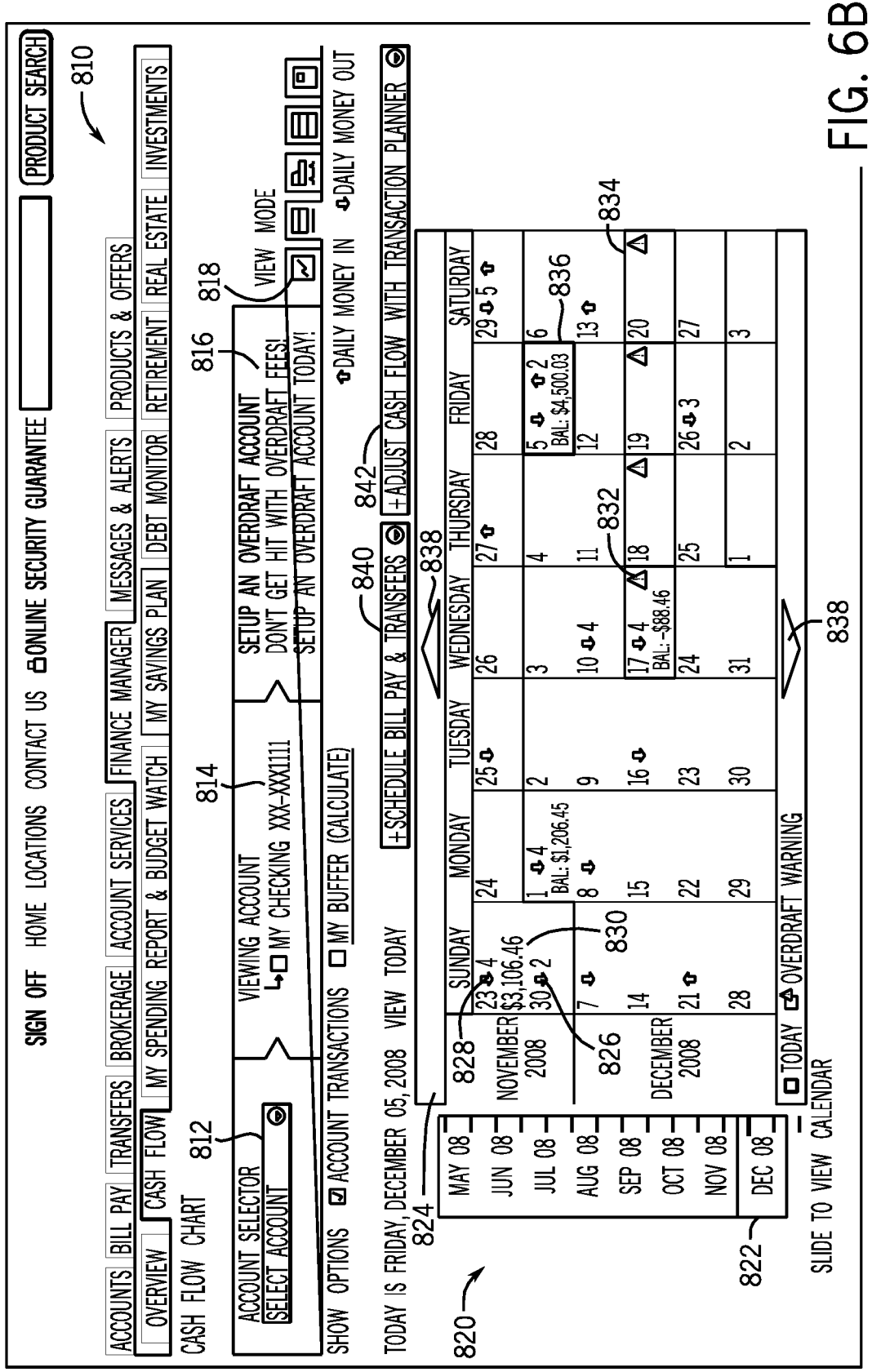
FIG. 6B is a screen display that may be provided to a user to permit the user to view a calendar view of future balance and cash flow projections according to an exemplary embodiment.

Referring now to FIG. 6B, a screen display 810 is shown according to an example embodiment. Screen display 810 may be similar to screen display 250 illustrated in FIG. 5, in that screen display 810 provides a calendar 824 that includes historical and/or future cash flow and account balance data for one or more user accounts. Screen display 810 may include a select account option 812, an account identifier 814, an overdraft option 816, and a viewing option 818. Select account option 812 enables a user to identify one or more accounts, identified by account identifier 814, to be represented on display 810. Overdraft option 816 provides the user with the option of setting up an overdraft account to provide overdraft protection for the user. Viewing options 818 may be selectable to provide a variety different of formats for display 810, such as line graphs, calendars, bar charts, multi-account views, and so on.

Referring further to FIG. 6B, calendar 824 may display a calendar view of individual days 826, including a current day 836. Each of days 826 may include one or more of a status indicator 828, an account balance 830, and an alert 832. Status indicator 828 may indicate whether there is any activity regarding one or more accounts on a particular day, and may further indicate the nature of the activity (e.g., whether the activity was a cash inflow or a cash outflow). For example, as shown in FIG. 6B, status indicator 828 may be an arrow that points upward if there is a cash inflow, and downward if there is a cash outflow. Further, the color of status indicator 828 may be linked to cash inflows/outflows (e.g., blue or green for cash in flows, red or orange for cash outflows, etc.). Alert 832 may provide the user with, for example, an indication that one or more accounts are projected to be overdrawn on a certain day or a number of days. For example, as shown in FIG. 6B, the user's account balance is scheduled to be negative $88.46 as of December 17 (as a result of an anticipated cash outflow), and not be positive again until December 21 (as a result of an anticipated cash inflow). During this period, an alert 832 is provided for each individual day (e.g., an image or icon such as a yellow triangle/exclamation point, etc.). Furthermore, in some embodiments, any days for which a user is projected to have a negative balance may be shaded, colored, etc. so as to make any such days easily identifiable by a user.

In one embodiment, a date range 820 and date range selector 822 may be provided as part of display 810. Date range 820 may be provided along a side or bottom of calendar 824, and may provide a larger date range than that provided by calendar 824. For example, while calendar 824 may include a time period of approximately 4-6 weeks, date range 820 may include a date range of 10-14 months. Date range selector 822 may be movable along date range 820 (e.g., via use of a computer mouse, etc.), such that the dates shown in calendar 824 reflect the dates chosen by a user via date range selector 822. While date range 820 is represented in FIG. 6B as a ruler-type display with dates along one edge, a variety of methods of display date range 820 may be used according to various alternative embodiments (e.g., miniaturized calendar displays, a pull-down menu of selectable months, weeks, etc., and so on). Furthermore, as an alternative to using date range selector 822, a user may select one of scrolling options 838, which act to scroll the displayed dates upward or downward based on user inputs.

According to one embodiment, display 810 may further include options 840, 842. Option 840 may be a "Schedule Payment or Transfer" option that enables a user to schedule a bill payment or transfer for a particular day. Option 842 may be an "Adjust Cash Flow" option that directs a user to a transaction planning screen where a user can adjust the dates, amounts, etc. of planned transactions. Alternatively, transfers and other cash flows can be scheduled, re-scheduled, etc. by a user selecting any individual day 826.

Figure 6C:
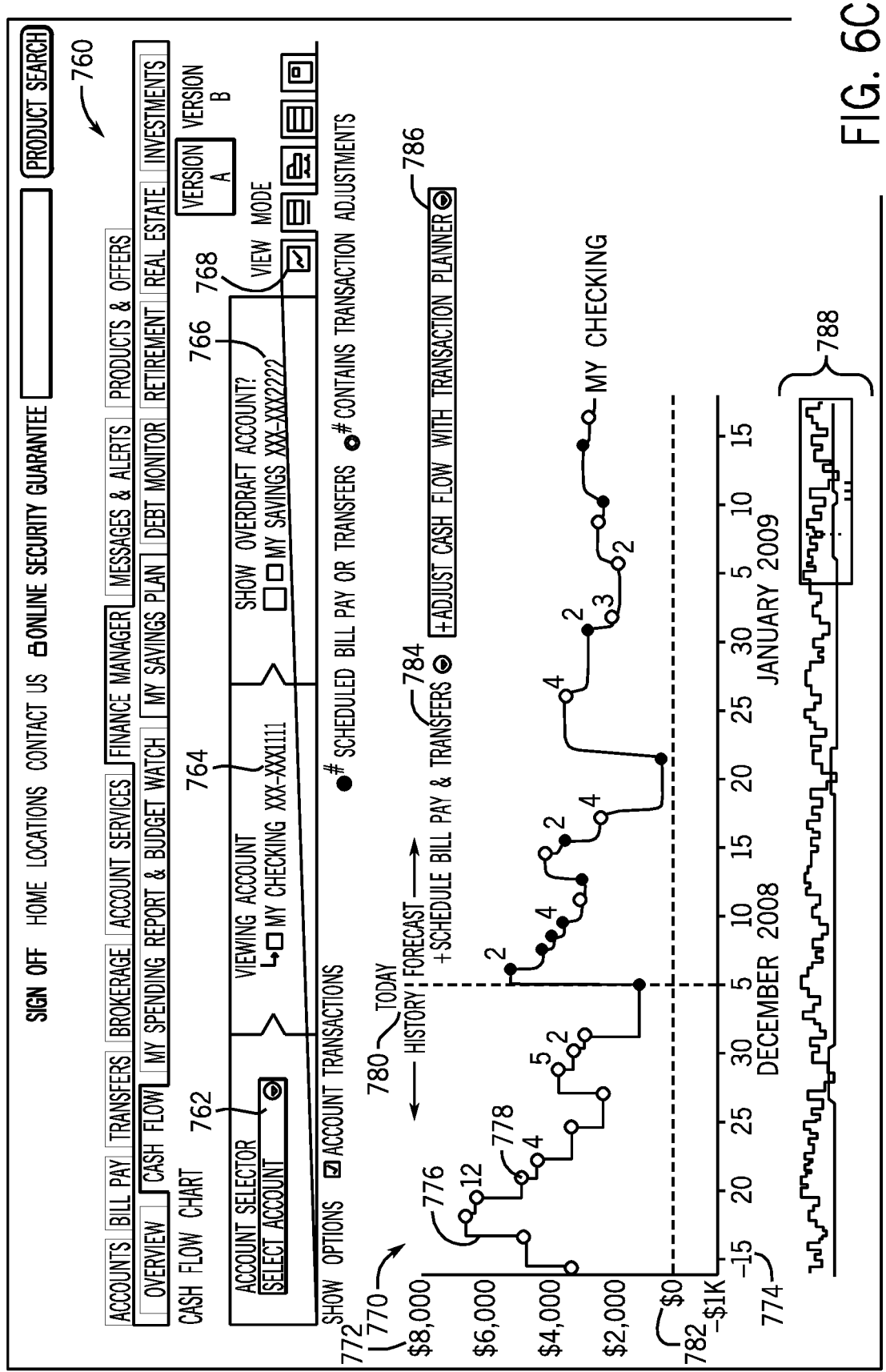
FIG. 6C is a screen display that may be provided to a user to permit the user to view a graph view of future balance and cash flow projections according to an exemplary embodiment.
Figure 6D:
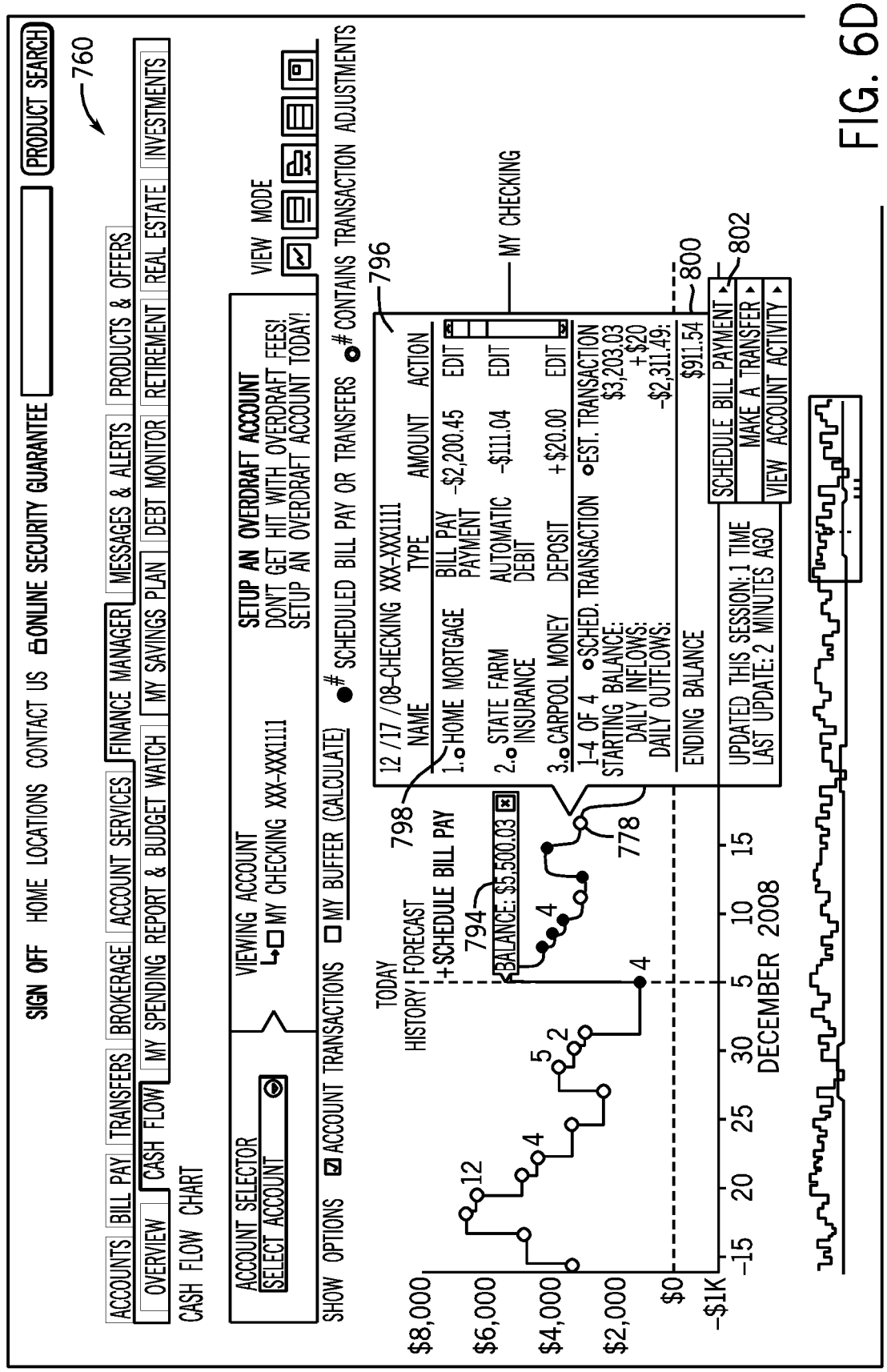
FIG. 6D is the screen display of FIG. 6C showing an additional screen portion according to an exemplary embodiment.

Referring to FIGS. 6C and 6D, a screen display 760 is shown according to an example embodiment. Display 760 may be similar to display of the graph 302 shown in FIG. 6A, in that screen display 760 may provide a line graph such as graph 770 that indicates the account balance for one or more accounts over a specific time period. Display 760 may include an account selection option 762, an account identifier 764, an overdraft option 766, and viewing options 768.

Graph 770 may include a line 776 and a number of transaction indicators 778. Line 776 tracks the historic and projected account balances for one or more specific accounts (selected via account selection option 762 and identified by account identifier 764) and provides indicators 778 for any days having account activity (deposits, payments, etc.). Further graph 770 may include a current date indicator 780 that indicates the current date (e.g., via a dashed line, a colored line, etc.) and a zero-balance indicator 782 that represents a zero account balance for the accounts represented by graph 770. Further, a date range selector 788 may be provided and function similarly to date range selector 822 discussed with respect to FIG. 6B.

Referring to FIG. 6D, in some embodiments, indicators 778 are selectable such that a user is presented with additional financial data associated with a particular day. For example, a pop-up or other type of image 796 may be provided that identifies one or more transactions 798 (e.g., a mortgage payment, insurance payment, a deposit, etc.) and further provides an account balance field 800 that identifies the account balance for that day. Image 796 may further include a menu 802 of options (e.g., bill payment scheduling, transfer activity, other account activity, etc.) that direct a user to other financial planning and account data. According to one embodiment, a user may select any one of a number of indicators 778 and be provided with similar information to that shown as part of image 796. Further, users may edit any or all of the data provided as part of image 796, and screen display 760 will then be updated accordingly to reflect any such modifications.

Figure 6E:
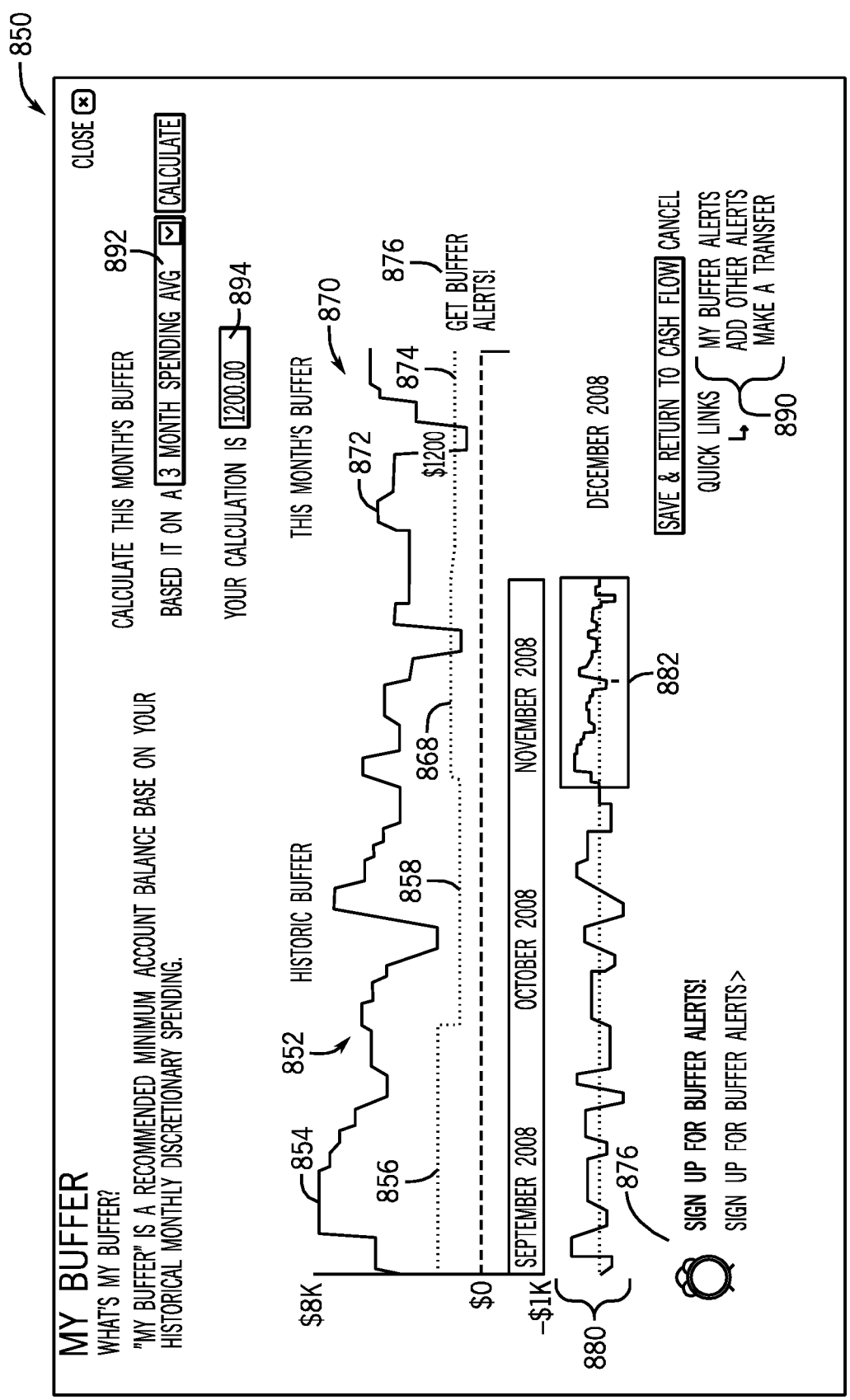
FIG. 6E is a screen display that may be provided to a user to permit the user to view a graph view of buffer data according to an exemplary embodiment.

Referring to FIG. 6E, a screen display 850 is shown according to an example embodiment. Screen display 850 may enable a user to view and/or modify a "buffer" for one or more accounts. In one embodiment, a buffer is a minimum account balance that is determined based on historical monthly spending of a user. As shown in FIG. 6E, a user may be provided with an option 892 that enables a user to select a historic time period (e.g., 3 months, 6 months, etc.) over which to determine a buffer. Spending logic 145 may then calculate a recommended buffer amount in buffer field 894 (e.g., such as $1200 as shown in FIG. 6E).

Referring further to FIG. 6E, a graph 852 (e.g., a historic buffer graph) may be provided that includes a line 854 representing an account balance and lines 856, 858, 868 that represent historic buffer amounts for various time periods (e.g., on a per month basis, etc.). The time period used to generate graph 852 may be selected by moving a date range selector 882 along a date range 880 to a desired date range or time period. A graph 870 (e.g., a current buffer graph) may also be provided that includes a line 872 representing the current account balance and a line 874 that represents a recommended current buffer amount. An option 876 ("Get Buffer Alerts") may be provided in order to permit a user to receive a notification (e.g., an email, text message, SMS, etc.) whenever the user's account balance falls below the buffer. Additional links 890 may further be provided that enable a user to access additional tools and data.

Figure 6F:
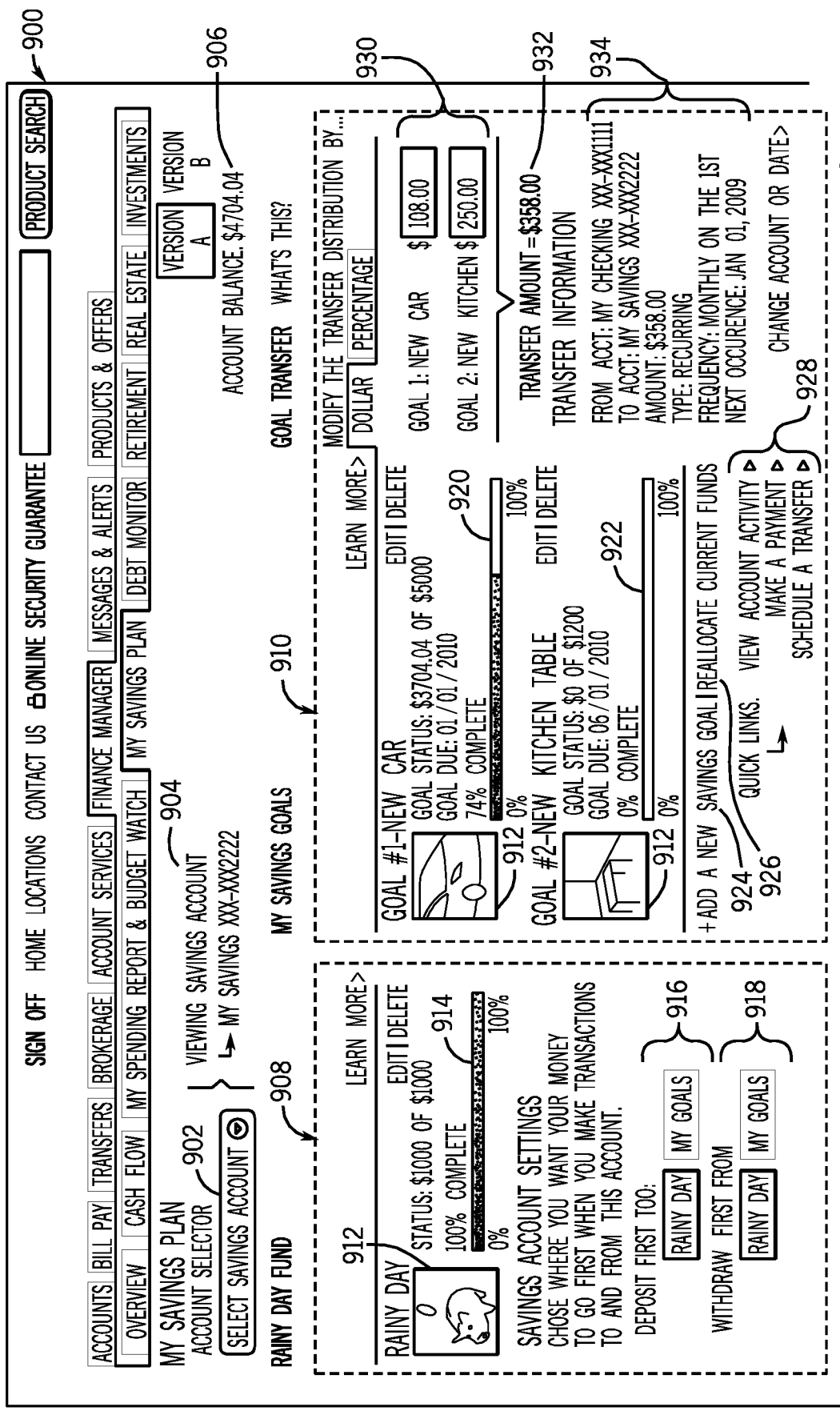
FIG. 6F is a screen display that may be provided to a user to permit the user to view savings plan data according to an exemplary embodiment.

Referring now to FIG. 6F, savings planning logic 140 may be configured to enable a user to set up one or more savings goals, rainy day funds, etc. For example, a user may wish to set savings goals for a new car, a vacation, or for funding a child's education. Savings planning logic 140 may be configured to enable a user to enter certain parameters of a savings goal, such as a total savings goal, a due date, etc., and then further enable the user to track the user's progress of reaching the goal. Further, by analyzing the user's overall spending and savings habits, savings planning logic 140 may suggest how a user may allocate funds most effectively to meet various savings goals.

As shown in FIG. 6F, savings planning logic 140 and/or network interface logic 124 may be configured to provide a screen display such as screen display 900 to a user. According to one embodiment, display 900 provides various savings goals and similar information for a particular account. A user may use an account selection option 902 to select a desired account, which is identified by an account identifier 904. An account balance field 906 may indicate the current account balance. A user may set up multiple savings goals for an individual account.

Referring further to FIG. 6F, savings planning logic 140 may enable a user to set up a "rainy day" fund (e.g., an emergency fund, etc.) that may be used to maintain a certain amount of funds to cover emergencies, unexpected expenses, or other activities. According to one embodiment, a screen portion 908 may provide various data and information regarding setting up a savings fund such as a rainy day fund. Screen portion 908 may include a graphical indicator 912, a status indicator 914, and account set-up options 916, 918. Graphical indicator 912 may be a picture, image, or other graphical indicator and may provide a representation of a specific fund or goal. A user may select indicator 912 from a number of images that may be provided to a user, or alternatively, a user may create or download a custom image to be used as indicator 912. Status indicator 914 may provide the user with an indication of the user's progress toward a savings goal. For example, status indicator 914 shown in FIG. 908 is a status bar that indicates that the user is 100% complete with reaching a goal of $1000 in savings. According to various other embodiments, other types of status indicators may be used to track a user's progress toward a savings goal. Account set-up options 916, 918 enable user to identify which goals or funds to deposit funds into first, and withdraw funds from first. For example, a user may indicate that he or she wishes to complete a first savings goal before a second savings goal. The user may utilize options 916, 918 to indicate that funds are to be deposited first into the first savings goal, and withdrawn first from the second savings goal, thereby maximizing the amount of funds going toward the first savings goal.

Referring further to FIG. 6F, in addition to a fund such as a rainy day fund, savings planning logic 140 may be configured to further enable a user to set up savings goals for a wide variety of goals. As shown in FIG. 6F, a screen portion 910 may provide data or information regarding one or more savings goals. For example, a first goal may be a new car, and may be represented by a graphical indicator 912 and a status indicator 920. A second goal may be a new kitchen table, and may be represented by a graphical indicator 912 and a status indicator 922. For each goal, savings planning logic 140 may provide a total goal amount, an amount saved to date, and a percentage of the goal reached. Savings planning logic 140 may further provide other indicators such as how far along a user should be toward reaching a savings goal at any point in time, and so on.

According to one embodiment, savings planning logic 140 may provide options 930 to a user to enable a user to identify the amount of funds to be allocated to each savings goal for a given time period (e.g., on a monthly basis, etc.). A total transfer amount field 932 identifies a total amount to be transferred to a specific account and allocated to specific savings goals. A transfer information area or portion 934 may provide additional details regarding specific fund transfers, such as account numbers, transfer amounts, recurrence date and/or frequency, etc. Savings planning logic 140 and/or network interface logic 124 may also provide one or more options 924, 926, 928 that are selectable by a user to direct the user to various other screen displays and interfaces that enable a user to add a new savings goal, reallocate current funds between savings goals, view account activity, and perform other financial planning and account management functions.

Figure 7:
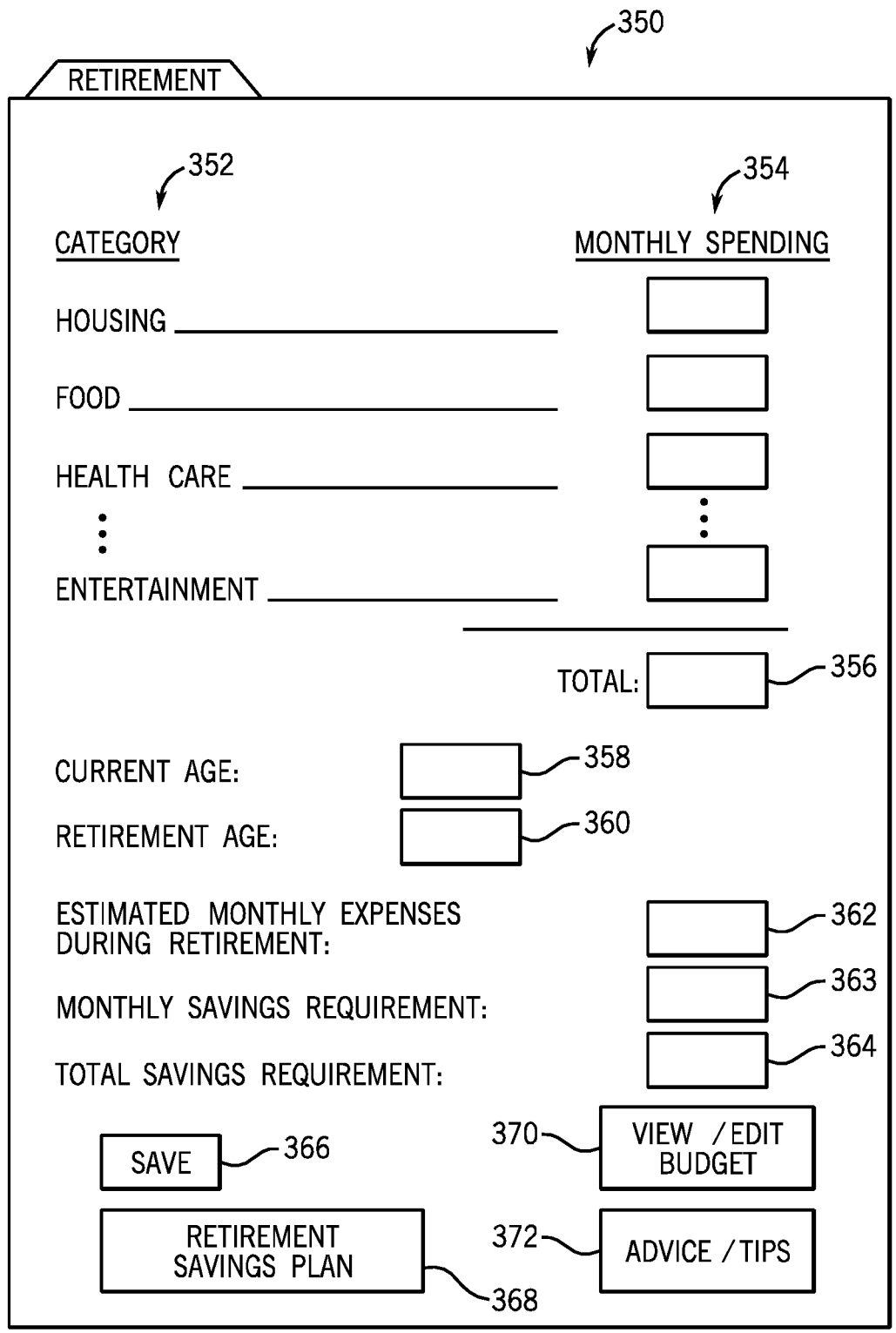
FIG. 7 is a screen display that may be provided to a user to permit the user to view and provide retirement planning and management data according to an exemplary embodiment.
Figure 8:
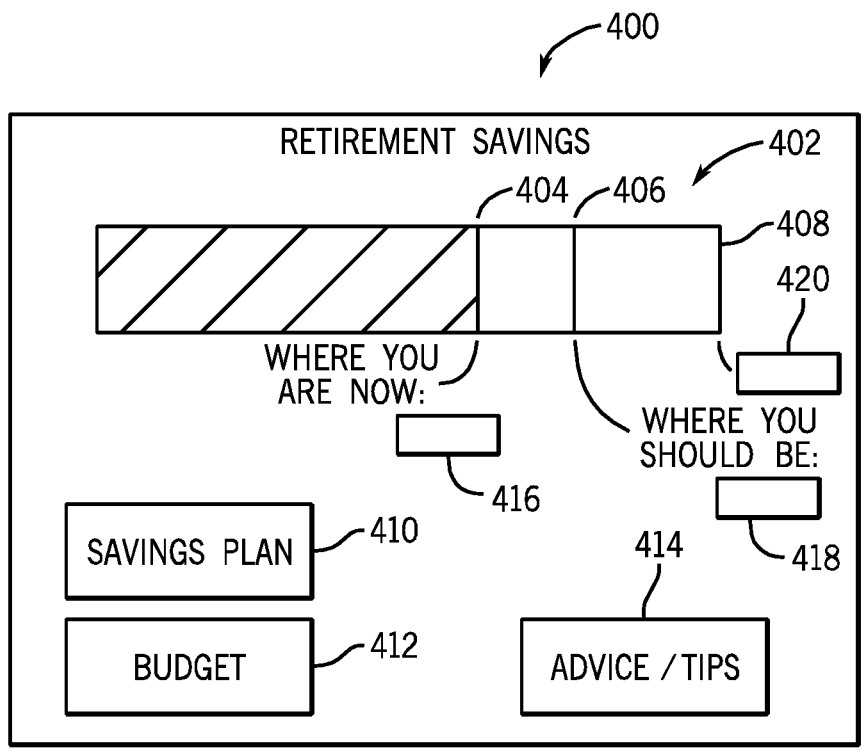
FIG. 8 is a screen display that may be provided to a user to permit the user to view the progress of the user regarding a retirement savings plan according to an exemplary embodiment.
Figure 9:
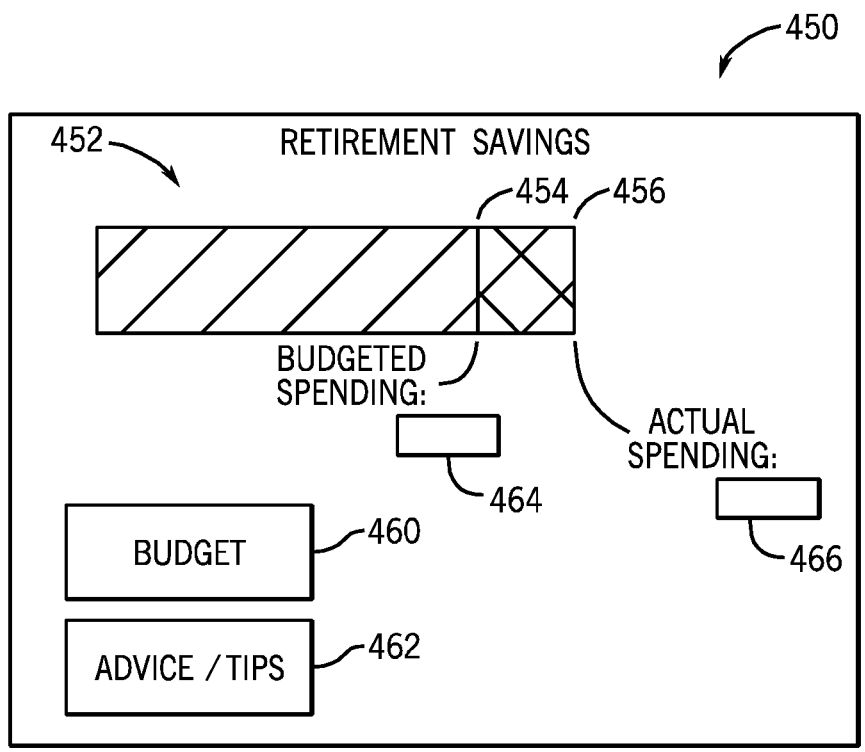
FIG. 9 is a screen display that may be provided to a user to permit the user to view the status of a user's retirement spending plan according to an exemplary embodiment.

Referring now to FIGS. 7-9, retirement planning logic 146 may be configured to generate one or more different types of retirement plans for users. For example, prior to retirement age (e.g., during an "accumulation" period), users may be primarily interested in planning and managing a retirement plan intended to permit the user to accumulate sufficient savings to retire at a certain age and be able to sustain a certain standard of living (e.g., providing certain levels of spending). Similarly, after retirement age (e.g., during actual retirement), users may be primarily interested in planning and managing a retirement plan intended to permit the user to maintain certain spending levels while maintaining sufficient savings to last throughout the retirement period. Retirement planning logic 146 may provide user with plans, reports, alerts, etc. to address both of these needs.

Referring to FIG. 7, a screen display 350 is shown according to an exemplary embodiment. Screen display 350 may be provided by retirement planning logic 146 and/or network interface logic 124, and may be accessed, for example, by a user selecting a retirement planning module that may be displayed as part of a screen display such as screen display 350 shown in FIG. 3. In some embodiments, screen display 350 may enable a user to provide one or more inputs regarding a retirement plan, which may be one or both of a retirement savings plan (e.g., for use during the accumulation period) and a retirement spending (or budgeting) plan (e.g., for use during the retirement period). As shown in FIG. 7, screen display 350 may list a number of transaction or spending categories 352 (e.g., housing, food, health care, etc.) that may represent the major expense categories for retirees. In some embodiments, users may be able to add, delete, or define custom categories to be displayed as part of screen display 350. In other embodiments, categories 352 may be automatically selected by retirement planning logic 146 based on spending categories within a budget plan for a user, as discussed in greater detail with respect to FIG. 11.

According to one embodiment, retirement planning logic 146 may be configured to pre-populate projected spending amounts 354 (e.g., projected weekly spending amounts, projected monthly spending amounts, etc.) based on account data of the user stored in data storage system 128. For example, data storage system 128 may store historic spending data (e.g., average spending amounts per category) for categories 352, and retirement planning logic 146 may be configured to determine projected spending amounts 354 based on accessing the historic spending data. In alternative embodiments, projected spending amounts 354 may be based on other data, such as budgeted cash flow amounts from one or more budget plans of the user, and so on. According to an exemplary embodiment, retirement planning logic 146 may permit a user to modify any of the pre-populated spending amounts by manually entering or otherwise providing inputs to identify a projected spending amount 354 for one or more of categories 352. A total projected spending amount 356 may be provided via screen display 350 and may represent the total projected spending amount for the user over a certain period of time, such as one month, one week, one year, and so on.

In some embodiments, retirement planning logic 146 may further permit a user to enter the user's current age 358 and the user's expected retirement age 360. Alternatively, these values may be accessed from a user profile stored in data storage system 128 or may be based on default values (e.g., age 65 as an expected retirement age). Retirement planning logic 146 may use current age 358 and expected retirement age 360 in the determination of various values incorporated into one or more retirement plans, including savings requirements (e.g., to take into account the amount of time the user has to save a certain amount), spending projections (e.g., to take into account an expected length of retirement and project savings levels accordingly), and so on.

Retirement planning logic 146 may further be configured to determine an estimated or projected periodic spending amount 362 (e.g., a monthly spending level), a periodic savings requirement 363 (e.g., a monthly savings amount required to meet a total savings goal), and/or a total savings requirement 364 (e.g., a total amount required to maintain spending at desired levels throughout retirement). Spending amount 362, savings requirement 363, and savings requirement 364 may provide the user with insight into whether the user needs to modify one or more parameters of the retirement plan to, for example, make one more of spending amount 362, savings requirement 363, and savings requirement 364 more attainable and/or more practical based on the individual user.

As further shown in FIG. 7, a user may save a retirement plan by selecting option 366 ("Save"). In some embodiments, a user may be permitted to save numerous retirement plans to permit the user to evaluate various retirement scenarios (e.g., different retirement savings plans, different retirement ages, different spending levels during retirement, and so on). If the user desires to generate a retirement savings plan, a user may select an option 368 ("Retirement Savings Plan") and be directed to a screen display that permits the user to set up and/or modify a savings plan intended to permit the user to accumulate sufficient funds for retirement. Various screen displays, reports, alerts, and so on may be provided to the user in order to track the user's progress in reaching a savings goal for retirement.

Figure 11:
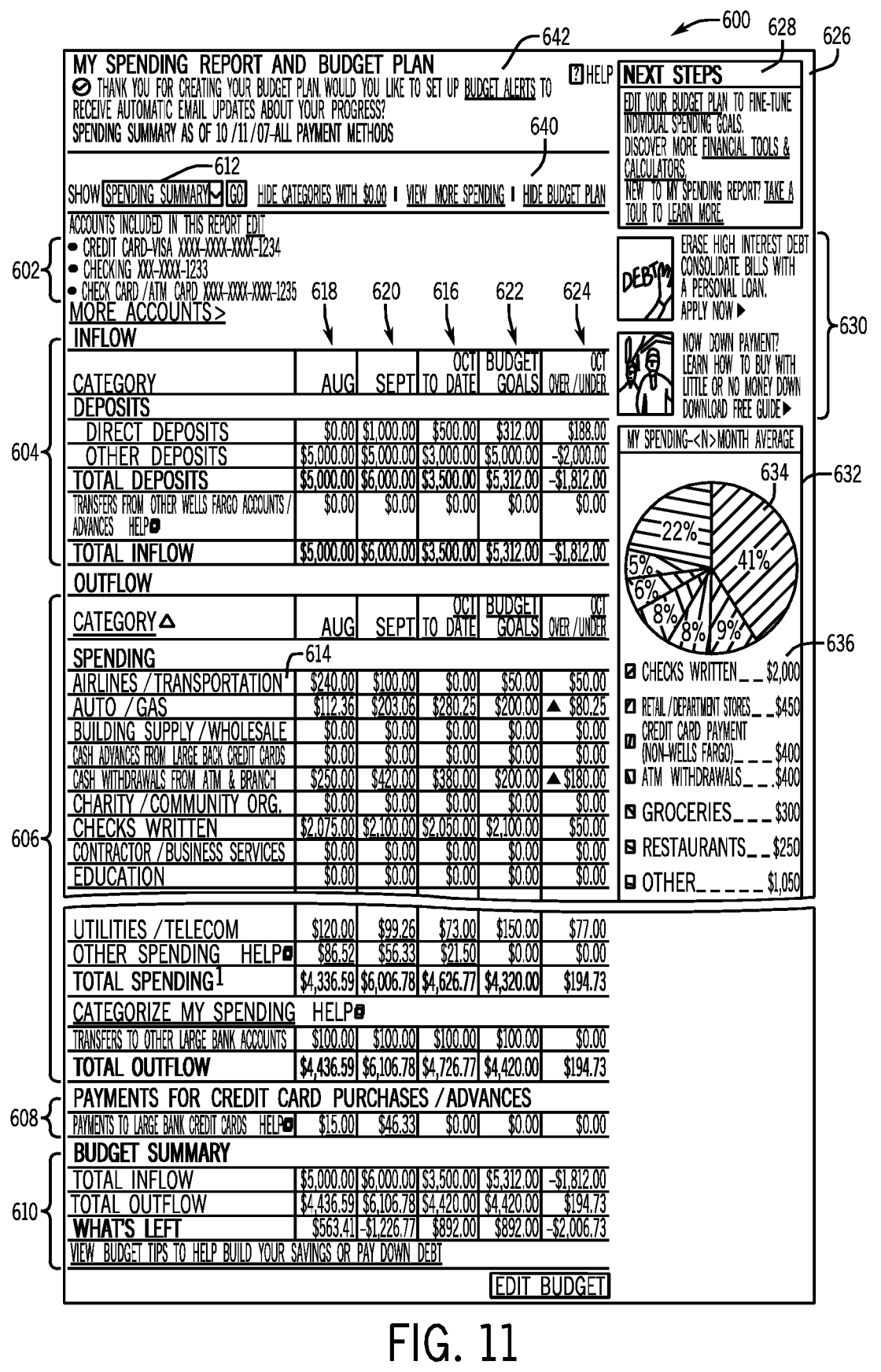

If a user desires to view and/or edit a budget plan, the user may select an option 370 ("View/Edit Budget) and be directed to a budget plan or report, for example, as shown in greater detail in FIG. 11. Accessing a budget plan may provide the user with information regarding additional savings opportunities (e.g., by identifying discretionary spending trends that may be reduced to generate additional savings amounts for retirement). Similarly, if a user selects an option 372 ("Advice/Tips"), the user may be provided with customized guidance regarding retirement planning. For example, retirement planning logic 146 may access account data stored in data storage system 128 for one or more accounts of a user, and based upon accessing this data, provide suggestions as how to reduce spending, increase savings, etc., in order to assist the user in realizing the user's retirement goals.

Referring now to FIG. 8, a screen display 400 is shown according to an exemplary embodiment. Screen display 400 may be provided as an individual screen display, or may be incorporated into one or more other screen displays (e.g., as a display module presented as part of a summary display of account information, such as screen display 150 shown in FIG. 3). As shown in FIG. 8, screen display 400 may provide a user with a chart such as bar chart 402 indicating the user's progress toward a retirement savings goal (e.g., a projected retirement savings requirement, etc.), including a current savings amount 404, a projected savings amount 406, and a savings goal 408 (e.g., a total savings requirement for retirement, a yearly savings goal, etc.). Chart 402 is intended to provide users with a simplified representation of the user's progress toward a retirement savings goal. For example, chart 402 may provide a user with a representation of the amount the user has actually saved and the amount the user should have saved, based on the user's age and the user's expected retirement age. As shown in FIG. 8, chart 402 reflects a deficit of funds saved relative to the amount of funds estimated as being required to meet savings goal 408. In some embodiments, actual dollar amounts 416, 418, and 420 may be provided for current savings amount 404, projected savings amount 406, and savings goal 408, respectively.

In some embodiments, a user may be provided with options 410, 412, and 414. Option 410 ("Savings Plan") may permit user to generate, view, and/or modify a savings plan intended to assist the user in meeting savings goal 408. Option 412 ("Budget") may permit a user to generate, view, and/or modify a budget plan intended to assist the user in identifying additional potential savings opportunities. Similarly, option 414 ("Advice/Tips") may permit users to view customized guidance regarding a user's retirement plan and/or other financial plans. For example, should a user be lagging behind in reaching savings goal 408, option 414 may direct the user to resources such as a savings and/or budget plan that may help in modifying the user's savings/spending habits. As another example, should a user be ahead of pace in reaching savings goal 408, option 414 may provide the user with other possible uses for excess funds (e.g., such as paying down debt, saving for other, specific savings goals (e.g. such as a vacation, school tuition, etc.)).

Referring to FIG. 9, a screen display 450 is shown according to an exemplary embodiment. Screen display 450 may be provided as an individual screen display, or may be incorporated into one or more other screen displays (e.g., as a display module presented as part of a summary display of account information, such as screen display 150 shown in FIG. 3). As shown in FIG. 9, screen display 450 may provide a user with a chart such as bar chart 452 indicating the user's status regarding a retirement spending plan (e.g., a spending plan intended to provide for appropriate spending levels over the duration of a user's retirement, etc.), including a budgeted spending amount 454 and an actual spending amount 456 for a given time period (e.g., one month, etc.). Chart 452 is intended to provide users with a simplified representation of the user's spending relative to budgeted amounts. As shown in FIG. 9, chart 452 reflects that the user's actual spending exceeds the budgeted spending for a particular time period. In some embodiments, actual dollar amounts 464, 466 may be provided for budgeted spending amount 454 and actual spending amount 456.

According to an exemplary embodiment, screen display 450 may include options 460, 462. As similarly discussed with respect to screen display 400 shown in FIG. 8, options 460 ("Budget") and option 462 ("Advice/Tips") may provide the user the ability to generate, view, and/or modify one or more budget plans, or to access additional guidance regarding retirement spending. Other options may be provided as part of screen display 450 according to various alternative embodiments.

According to an exemplary embodiment, retirement planning logic 146 may be further configured to provide one or more alerts to a user. For example, should a user's actual savings progress indicate that the user will likely not meet a retirement savings goal at a current savings rate, or should a user's actual spending levels indicate that a user's savings may not last for the duration of the user's retirement, one or more alerts may be provided to the user. The alert may be provided in a variety of ways, including email, a text message, SMS (short message service), and so on. The alert may further include links to additional displays and other information that provide the user with helpful guidance on getting back on track regarding retirement savings and/or spending habits of the user. An exemplary screen shot enabling users to set up and/or modify a number of user alerts is discussed with respect to FIG. 12.

Figure 10A:
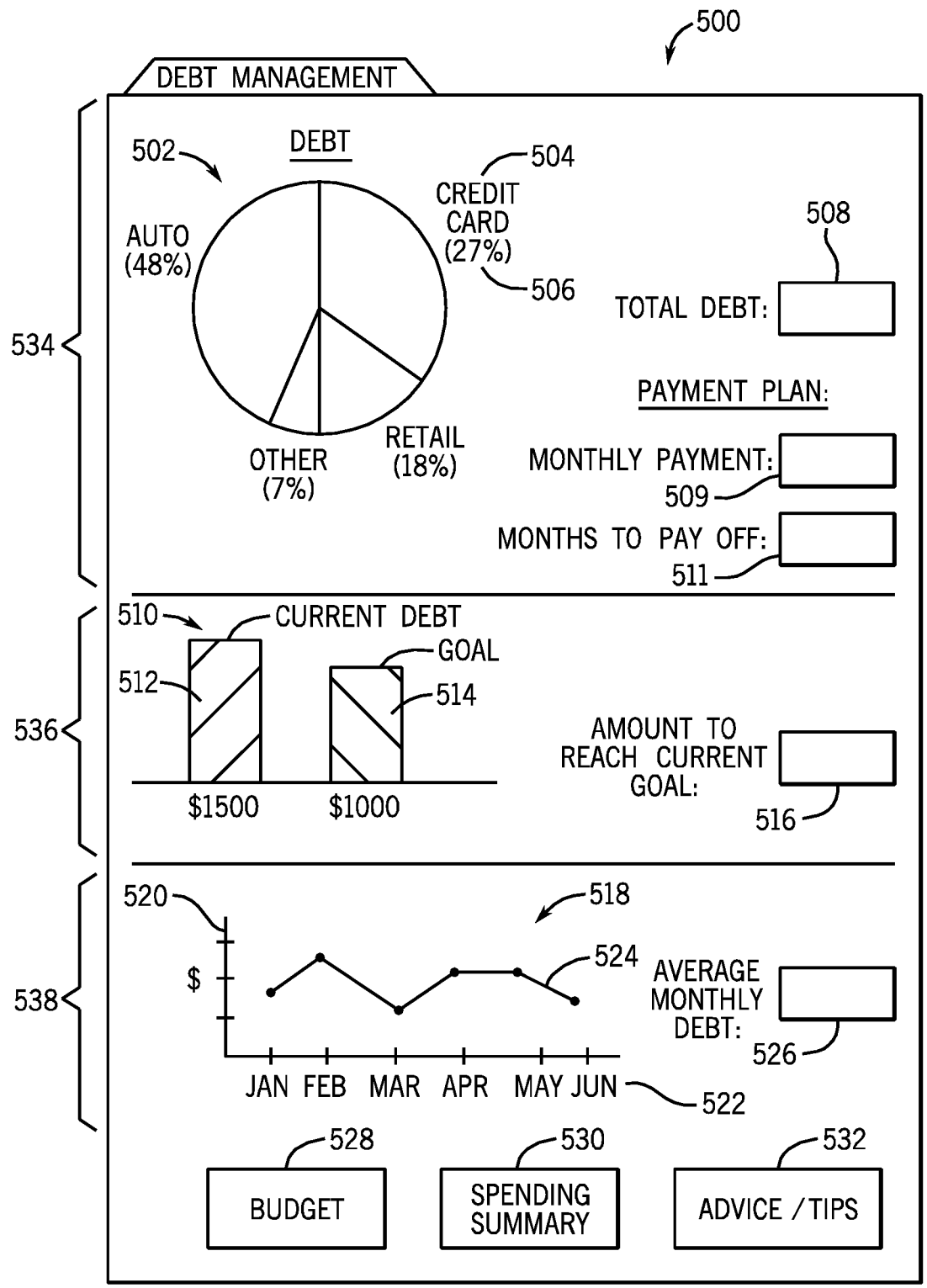
FIG. 10A is a screen display that may be provided to a user to permit the user to provide and view debt management data according to an exemplary embodiment.

Referring now to FIG. 10A, a screen display 500 is shown according to an exemplary embodiment. Screen display 500 may be provided by debt management logic 148 and/or network interface logic 124, and may be accessed, for example, by a user selecting a debt management module that may be displayed as part of a screen display such as screen display 150 shown in FIG. 3A. In some embodiments, screen display 500 may enable a user to provide one or more inputs regarding a debt payment plan, which may include one or more sources of debt. The debt payment plan may be intended to permit the user to pay off debt related to one or more accounts over a period of time by making periodic payments.

According to one embodiment, debt management logic 148 may be configured to access data in data storage system 128 to identify various amounts of debt owed by a user (e.g., auto loans, credit card debt, debt to individual retail entities, and so on), and to provide a graph or chart such as pie chart 502. Chart 502 may provide the user with a consolidated view of the debt owed by the user for accounts processed by system 110. In some embodiments, debt management logic 148 may be further configured to access and aggregate data regarding a user's accounts at third-party institutions, such that chart 502 may provide a more complete picture of the user's overall debt situation. Screen display 500 may provide a total debt amount 508, and determine a periodic payment amount 509 (e.g., a monthly payment, etc.) and a time period 511 (e.g., a number of months, years, etc.) within which total debt amount 508 may be paid off based on periodic payment amount 509.

According to an exemplary embodiment, debt management logic 148 may access data stored in data storage system 128 and/or interface with one or more logic components such as budgeting logic 142 in order to generate a debt payment plan that includes periodic payments intended to pay off a user's debt over a period of time. For example, debt management logic 148 may access a budget and/or spending plan to identify, for example, surplus monthly cash flows, discretionary spending amounts, excess savings amounts, etc., usable to assist in payment of debt owed by a user. Such data may further be used to accelerate an existing debt payment plan (e.g., such that an existing amount of debt is paid off in a shorter time frame than previously planned).

In some embodiments, debt management logic 148 may track the user's progress in paying down one or more amounts of debt. For example, as shown in FIG. 10A, a bar chart 510 may show a goal 514 that represents an amount of debt a user hopes to reduce the user's current debt to within a certain period of time, such as one month, etc. The user's current debt 512 may be displayed adjacent goal 514 in order to provide the user with a graphical indication of the relative progress of the user. Screen display 500 may further indicate an amount 516 required to reach the current goal. Similarly, a line graph 518 may show a user's debt amount 520 over time periods 522 via a line 524, and further indicate an average monthly debt amount 526.

Referring further to FIG. 10A, screen display 500 may include one or more discrete screen portions 534, 536, 538. In some embodiments, one or more of screen portions 534, 536, 538 may be provided as an individual screen display, or alternatively, as a display module that makes up part of a larger screen display such as that shown in FIG. 3A. Furthermore, the arrangement of screen portions 534, 536, 538 as shown in FIG. 10A may be modified according to various alternative embodiments.

Figure 10B:
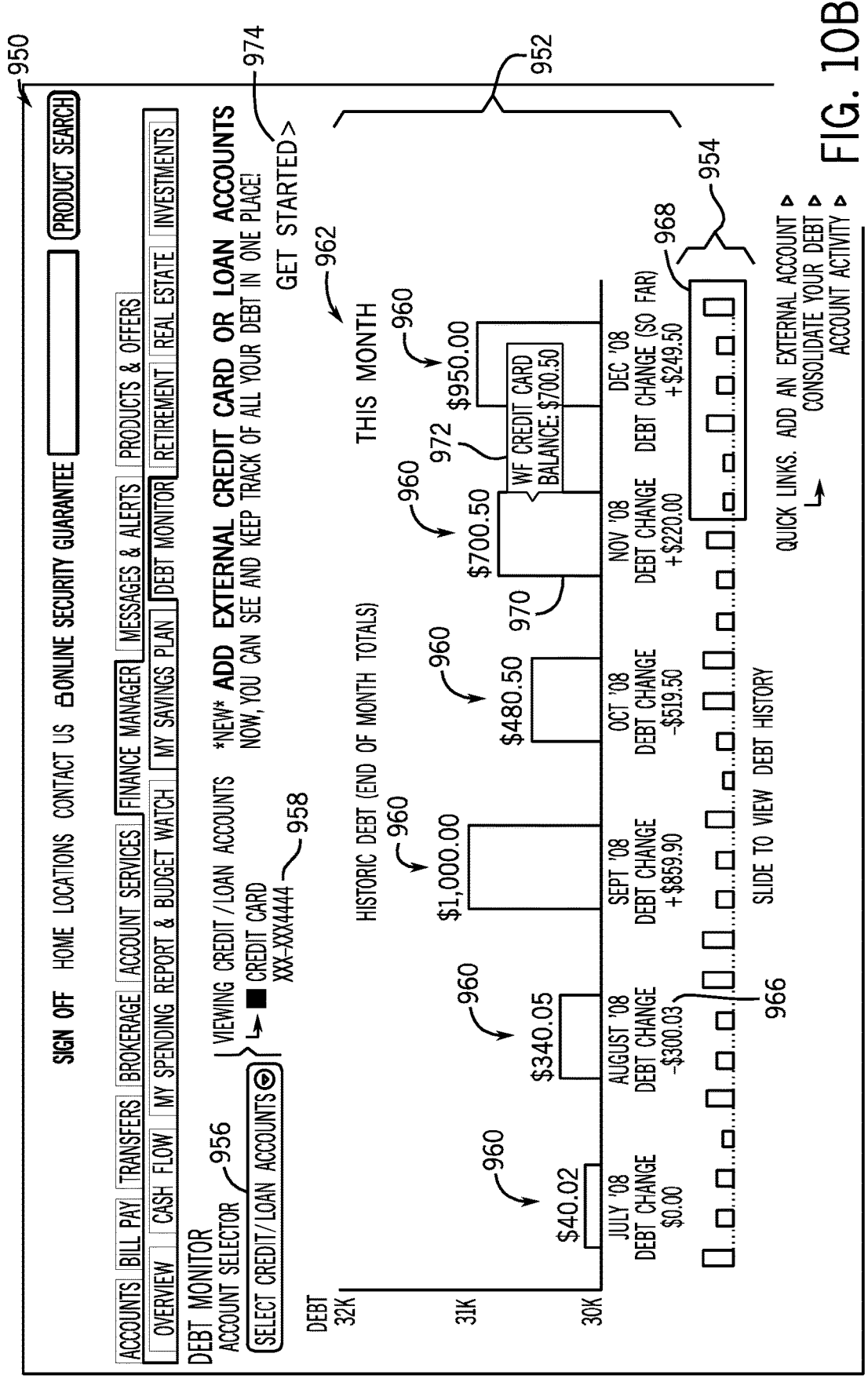
FIG. 10B is a screen display that may be provided to a user to permit the user to monitor debt levels for various accounts according to an exemplary embodiment.

Referring now to FIG. 10B, in some embodiments, debt management logic 148 and/or network interface logic 124 may be configured to provide a screen display such as screen display 950 ("Debt Monitor"). Display 950 may provide a user with data and other information regarding a user's historic, current and/or projected debt levels for one or more accounts (e.g., credit or loan accounts, etc.). An account selection option 956 may be used to select one or more accounts to be represented in display 950, and an account identifier 958 may identify a specific account selected by a user. A graph 952 may provide historic, current, and/or projected debt levels and other related data and information for a user over a period of time. For example, as shown in FIG. 10B, graph 952 includes a number of status bars 960 that each provide a historic debt level for a specific month, and a current status bar 962 that provides the current debt level. A change indicator 966 may indicate a change in debt from month to month. For example, as shown in FIG. 10B, the user's debt increased by $300.03 between July 2008 and August 2008. The time period represented by graph 952 may be selected by a user moving date range selector 968 along date range 954.

According to one embodiment, debt management logic 148 may be configured to identify a source of debt via an indicator 972. For example, as shown in FIG. 10B, indicator 972 identifies a credit card as being the source of $700.50 of debt for the month of November 2008. Other ways of indicating the source of debt may be used according to various other embodiments. For example, the various status bars shown in FIG. 10B may be shaded using different shading techniques, colors, etc., with each different shade representing a different source of debt (e.g., such that a single status bar may include a number of different shading types, each representing a different source of debt). Actual debt amounts may further be provided for each source of debt.

According to an exemplary embodiment, debt management logic 148 may be further configured to provide one or more alerts to a user. For example, should a user's current total debt (or other, specific debt amount) exceed a predetermined threshold, one or more alerts may be provided to the user. The alert may be provided in a variety of ways, including email, a text message, SMS (short message service), and so on. The alert may further include links to additional displays and other information that provide the user with helpful guidance on getting back on track regarding debt payment habits of the user (e.g., by identifying discretionary spending that may be used instead to pay off debt, etc.). An exemplary screen shot enabling users to set up and/or modify a number of user alerts is discussed with respect to FIG. 12.

As discussed above, budgeting logic 142 and/or spending logic 145 may facilitate the generation of various reports, etc., by enabling users (or, alternatively, various logic components) to identify potential sources of additional funds that may be used for savings goals, debt payment, etc. Referring to FIG. 11, a screen display 600 is shown according to an exemplary embodiment. Screen display 600 may be a spending report and budget plan interface (e.g., generated by one or more of budgeting logic 142, spending logic 145, and/or network interface logic 124) that provides a display of cash flow information and budget information simultaneously for a variety of categories. Alternatively, spending and budgeting data may be presented in a similar manner but in separate screen displays or reports. Screen display 600 may identify accounts 602 that are included in the report, inflow transactions 604, outflow transactions 606, and payments 608 for credit card purchases and advances. A budget summary 610 may further be provided. As also shown in FIG. 11, an option 612 may provide a user with, for example, a drop-down menu that enables a user to view credit card transactions only, check card transactions only, etc., or create a customized view. The various transactions may be categorized into transaction categories 614, and user interface 600 may provide a current cash flow amount 616 (e.g. month to date) and cash flow amounts 618, 620 for the previous two months (or other time periods).

In addition, in FIG. 11, screen display 600 may further provide budget cash flow amounts 622 (e.g., budget goals) and over/under amounts 624 for the current month. The over/under amounts 624 may represent the amount that the actual spending/saving of a user (as, for example, indicated by current cash flow amounts 616) is over or under budget cash flow amounts 622. According to an exemplary embodiment, over/under amounts that indicate that a user is outside of the budget cash flow amounts may be displayed in a manner intended to bring such cash flows to the user's attention. For example, over/under amounts may be in a different font color, bold, highlighted, etc.

Referring further to FIG. 11, a display portion 626 may be provided that includes links such as link 628 ("Edit Budget Plan") that permit the user to navigate to other services and applications. For example, should a user select link 628, a user may be directed to a user to a screen display that permits the user to adjust one or more budget cash flow amounts in the user's budget. Additional links 630 may further be provided in order to provide the user with additional financial and other information. A graphical display 632 may provide the user with a graphical representation 634 and associated listing 636 of spending trends for various transaction categories 614 over certain time periods of time (e.g., over specific months, averaged over specific months, etc.).

According to an exemplary embodiment, should a user wish to view screen display 600 without the budget data (e.g., budget cash flow amounts 622 and over/under cash flow amounts 624), a user may select an option 640 ("Hide Budget Plan"), upon which the user may be presented with only actual cash flow amounts. Further, according to another exemplary embodiment, a link 642 ("Budget Alerts") may be provided. Link 642 may be configured to direct a user to a separate user interface or screen display that enables a user to configure various types of budget alerts based on the user's current budget data and cash flow amounts.

In some embodiments, the average cash flow amounts may be determined over a predetermined time period that may be user-configurable such that a user may adjust the time period between varying lengths of time (e.g., 12 months, 6 months, 3 months, etc.). Furthermore, budgeting logic 142 may populate various budget cash flow amounts (e.g., monthly goals or targets for savings, spending, etc.) for various transaction categories with the average cash flow amounts for the category.

Various of the logic components described herein may be configurable to provide users with alerts, reports, or other periodic status indicators, etc. Referring to FIG. 12, a screen display 650 is shown according to an exemplary embodiment. Screen display 650 may enable users to create, view, and/or modify alerts for various applications and financial planning purposes. For example, as shown in FIG. 12, a user may modify one or more parameters related to security and general alerts 652 (e.g., a user name, a password, access limitations, etc.), personal checking account alerts 654 (e.g., an overdraft alert, etc.), personal savings account alerts 656, mortgage alerts 658, and budget alerts 660. According to various alternative embodiments, different types of alerts than those shown in FIG. 12 may further be included as part of screen display 650.

In some embodiments, a user may view a sample alert by selecting an option 664, upon which a user may be presented with, for example, a sample email or text message that would be generated should the user trigger an alert. Further, a user may modify the parameters of one or more alerts by selecting an option such as option 666 ("Modify"), upon which a user may be provided with a screen display that enables a user to modify one or more parameters of a specific alert. According to various embodiments, the parameters utilized for a specific alert may be dependent upon the type of the alert. Some parameters may include a triggering threshold (such as a savings, debt, or spending level), a delivery method (e.g., to trigger automatic, periodic alerts), an addressee, one or more accounts to which the alert relates, and so on. One or more of the alert parameters may be configurable by a user to provide customized alerts based on user preferences. Upon a user configuring one or more alerts, the user may select option 668 ("Save") upon which the alerts will be saves according to their current parameters.

According to an exemplary embodiment, budget logic 142 may be configured to provide budget data to users and receive inputs from users via one or more automated teller machines (ATMs) such as ATM 118. As used herein, ATM includes computerized telecommunication devices that are capable of dispensing cash to users and provide users, such as customers of financial institutions, with access to resources of the financial institution from remote locations (e.g., convenience stores, office buildings, etc.) without the need for a bank teller or other human operator. Such machines are often referred to as automated transaction machines, money machines, cash machines, and the like. Such machines may be owned by a financial institution that also offers one or more features of system 110 disclosed herein.

In one embodiment, budget logic 142 offers users with various budget monitoring features, as also discussed elsewhere herein, such that users may access, create, modify, view, etc., budget data via ATMs 118. For example, budget logic 142 enables users to set up a "budget watch" for cash withdrawals executed via ATMs 118 (e.g., for one or more accounts of the user that may permit ATM cash withdrawals). In some embodiments, budget logic 142 determines budget cash flow amounts (e.g., weekly, monthly, yearly, etc.) for ATM cash withdrawals based on cash withdrawal data stored in data storage system 128. Budget cash flow amounts may be determined based on historic averages of ATM cash withdrawals, or alternatively, according to any of the methods described elsewhere herein. Budget logic 142 may further be configured to predict a maximum available amount of funds available for ATM cash withdrawals based on the cash withdrawal and other data stored in data storage system 128 (e.g., by identifying surplus funds, etc.).

According to one embodiment, budget logic 142 may determine one or more budget cash flow amounts and provide them to a user, for example, via ATM 118. The user may then provide an input via ATM 118. The input may indicate that the user wishes to accept the budget cash flow amounts, reject the budget cash flow amounts, or modify the budget cash flow amounts. Budget logic 142 may then confirm or modify the appropriate budget cash flow amounts based on the input.

Once the budget cash flow amounts are determined, budget logic 142 monitors ATM cash withdrawals for the user. Budget logic 142 may be configured to provide one or more notifications to a user (e.g., to a user's mobile device, to a user's personal computer, or to an ATM being utilized by the user, etc.) indicating a current amount of ATM cash withdrawals relative to the budget cash flow amounts. For example, notifications may be provided after a budget cash flow has been exceeded, during an ATM transaction, indicating that the current transaction will result in a budget cash flow amount being exceeded, or upon the current ATM cash withdrawals coming within a certain dollar mount (e.g., $100, $500, etc.) of a budget cash flow amount. In this way, a user may be kept informed of their current status regarding the budget cash flow amounts for ATM cash withdrawals.

In some embodiments, notifications may be provided to user via ATMs 118. In other embodiments, notifications may also or alternatively be sent to another computing device of the user, and the user may customize how and where he or she would like to receive the notifications (e.g., the frequency of notifications, the configuration of the notifications, the triggering events for notifications being sent, one or more destinations for the notifications, etc.).

It should be understood that the various embodiments of data processing system 110 discussed herein provide many advantages over more typical financial applications or tools. For example, system 110 provides a wide variety of financial planning tools that may be integrated with and have direct access to data storage system 128, which, as discussed above, serves as the system of record for the user account data, thereby ensuring the integrity of the data utilized by the various logic and other components discussed herein. Further, due to the integrated arrangement of system 110, users may be provided with reliable and relevant advice and guidance that may be automatically customized for the user based on the user's individual financial situation and goals. Further yet, system 110 is able to track a user's progress toward any of a wide variety of financial goals such as savings goals, debt payment goals, and so on, and provide the user with user-configurable status updates and alerts based on various parameters.

The embodiments of the present disclosure have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A system comprising:
a processing circuit having at least one processor coupled to at least one memory, the processing circuit configured to:
provide a user with web access to online banking via a user device;
receive a first user input from the user device;
provide a customized user interface on the user device comprising a plurality of display areas based on the first user input;
automatically arrange, on the customized user interface, positions of the plurality of display areas on a single page display based on criteria associated with the user, and wherein the criteria is based on account activity of the user; and
rearrange the positions of the plurality of display areas of the customized user interface based on the user selecting an auto-arrange option, wherein selection of the auto-arrange option causes at least one of the plurality of display areas on the customized user interface to be rearranged in a new position based on the criteria associated with the user.

2. The system of claim 1, wherein each of the plurality of display areas comprises at least one link that is selectable to direct the user to additional details regarding a service associated with the respective display area.

3. The system of claim 1, wherein the plurality of display areas comprises a savings planning display area, a graphical spending summary display area, a textual spending summary display area, a budget analysis display area, and a cash flow display area.

4. The system of claim 3, wherein the customized user interface comprises a summary of spending amounts for the user over a period of time, wherein the budget analysis display area comprises a comparison of budgeted cash flow amounts and cash flow amounts for a plurality of transaction categories over the period of time, and wherein the cash flow display area comprises the cash flow amounts and account balances over the period of time.

5. The system of claim 4, wherein the cash flow display area comprises projected cash flow amounts and projected account balances through a future point in time.

6. The system of claim 3, wherein the plurality of display areas further comprises:
a credit management display area;
a retirement planning display area;
an advice and guidance display area; and
a messages and rewards display area.

7. The system of claim 1, wherein the criteria associated with the user further comprises at least one of saving habits of the user or spending habits of the user.

8. The system of claim 7, wherein the criteria is further associated with a plurality of factors comprising at least one of a type of account the user has open, a type of planning service the user is currently utilizing, an age of the user, or a debt of the user.

9. The system of claim 1, wherein at least one of the plurality of display areas comprises an alert based on at least one of a savings amount and a spending amount exceeding a user-configurable threshold.

10. The system of claim 1, wherein the plurality of display areas comprise information that is updated at least on a daily basis based on account data associated with an account associated with the user and stored in a data storage device.

11. A method comprising:
providing, by a processing circuit, a user with web access to online banking via a user device;
receiving, by the processing circuit, a first user input from the user device;
providing, by the processing circuit, a customized user interface on the user device comprising a plurality of display areas based on the first user input;
automatically arranging, on the customized user interface by the processing circuit, positions of the plurality of display areas on a single page display based on criteria associated with the user, and wherein the criteria is based on account activity of the user; and
rearranging, by the processing circuit, the positions of the plurality of display areas of the customized user interface based on the user selecting an auto-arrange option, wherein selection of the auto-arrange option causes at least one of the plurality of display areas on the customized user interface to be rearranged in a new position based on the criteria associated with the user.

12. The method of claim 11, wherein each of the plurality of display areas comprises at least one link that is selectable to direct the user to additional details regarding a service associated with the respective display area.

13. The method of claim 11, wherein the plurality of display areas comprises a savings planning display area, a graphical spending summary display area, a textual spending summary display area, a budget analysis display area, and a cash flow display area.

14. The method of claim 13, wherein the customized user interface comprises a summary of spending amounts for the user over a period of time, wherein the budget analysis display area comprises a comparison of budgeted cash flow amounts and cash flow amounts for a plurality of transaction categories over the period of time, and wherein the cash flow display area comprises the cash flow amounts and account balances over the period of time.

15. The method of claim 14, wherein the cash flow display area comprises projected cash flow amounts and projected account balances through a future point in time, and wherein the plurality of display areas further comprises:
a credit management display area;
a retirement planning display area;
an advice and guidance display area; and
a messages and rewards display area.

16. The method of claim 11, wherein the criteria associated with the user further comprises at least one of saving habits of the user or spending habits of the user.

17. The method of claim 16, wherein the criteria is further associated with a plurality of factors comprising at least one of a type of account the user has open, a type of planning service the user is currently utilizing, an age of the user, or a debt of the user.

18. The method of claim 11, wherein at least one of the plurality of display areas comprises an alert based on at least one of a savings amount and a spending amount exceeding a user-configurable threshold.

19. The method of claim 11, wherein the plurality of display areas comprise information that is updated at least on a daily basis based on account data associated with an account associated with the user and stored in a data storage device.

20. One or more non-transitory computer-readable storage media having instructions stored thereon that, when executed by a processing circuit, cause the processing circuit to:
provide a user with web access to online banking via a user device;
receive a first user input from the user device;
provide a customized user interface on the user device comprising a plurality of display areas based on the first user input;
automatically arrange, on the customized user interface, positions of the plurality of display areas on a single page display based on criteria associated with the user, and wherein the criteria is based on account activity of the user; and
rearrange the positions of the plurality of display areas of the customized user interface based on the user selecting an auto-arrange option, wherein selection of the auto-arrange option causes at least one of the plurality of display areas on the customized user interface to be rearranged in a new position based on the criteria associated with the user.

* * * * *